(12) United States Patent
Ikeda et al.

(10) Patent No.: US 11,906,191 B2
(45) Date of Patent: Feb. 20, 2024

(54) AIR-CONDITIONING APPARATUS

(71) Applicant: Mitsubishi Electric Corporation, Tokyo (JP)

(72) Inventors: Soshi Ikeda, Tokyo (JP); Kazuya Honda, Tokyo (JP); Jun Nishio, Tokyo (JP); Yuki Mizuno, Tokyo (JP); Katsuhiro Ishimura, Tokyo (JP); Yuji Motomura, Tokyo (JP); Kosuke Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 460 days.

(21) Appl. No.: 17/418,845

(22) PCT Filed: Feb. 27, 2019

(86) PCT No.: PCT/JP2019/007629
§ 371 (c)(1),
(2) Date: Jun. 28, 2021

(87) PCT Pub. No.: WO2020/174619
PCT Pub. Date: Sep. 3, 2020

(65) Prior Publication Data
US 2022/0057100 A1 Feb. 24, 2022

(51) Int. Cl.
*F25B 13/00* (2006.01)
*F24F 11/86* (2018.01)
(Continued)

(52) U.S. Cl.
CPC .............. *F24F 11/86* (2018.01); *F24F 5/001* (2013.01); *F25B 1/04* (2013.01); *F25B 13/00* (2013.01);
(Continued)

(58) Field of Classification Search
CPC ........ F24F 11/86; F24F 5/001; F24F 2221/54; F25B 1/04; F25B 13/00; F25B 2313/0272
See application file for complete search history.

(56) References Cited

U.S. PATENT DOCUMENTS 6,817,205 B1 * 11/2004 Lifson ..................... F25B 13/00
62/324.1
9,062,903 B2 * 6/2015 Sjoholm ................... F25B 1/00
(Continued)

FOREIGN PATENT DOCUMENTS

DE  10 2007 017 311 A1   10/2008
DE     102007017311 A1 * 10/2008 .............. F25B 13/00
(Continued)

OTHER PUBLICATIONS

Extended European Search Report dated Feb. 4, 2022 issued in corresponding European patent application No. 19917201.6, 9 pp.
(Continued)

*Primary Examiner* — Devon Russell
(74) *Attorney, Agent, or Firm* — XSENSUS LLP

(57) ABSTRACT

An air-conditioning apparatus includes a primary-side circuit in which a compressor, a first flow switching device, an outdoor heat exchanger, a second flow switching device, a first expansion device, and a relay heat exchanger are connected by pipes and in which refrigerant circulates; a secondary-side circuit in which the relay heat exchanger, a pump, a plurality of indoor heat exchangers, and heat medium flow control devices are connected by pipes and in which a heat medium circulates; and a controller configured to control the first and second flow switching devices such that in cooling and heating operations, the refrigerant and a heat-source-side fluid flow through the outdoor heat exchanger in opposite directions and the refrigerant flows through the relay heat exchanger in a constant direction. The (Continued)

pump is installed such that the heat medium, the refrigerant flow, and air for an air-conditioning target space flow in particular directions.

14 Claims, 10 Drawing Sheets

(51) Int. Cl.
  *F24F 5/00* (2006.01)
  *F25B 1/04* (2006.01)
(52) U.S. Cl.
  CPC ... *F24F 2221/54* (2013.01); *F25B 2313/0272* (2013.01)

(56) References Cited

U.S. PATENT DOCUMENTS

| | | | |
|---|---|---|---|
| 11,175,072 B2 * | 11/2021 | Tanaka | F24F 11/30 |
| 11,592,215 B2 * | 2/2023 | Brown | F25B 29/003 |
| 2011/0113802 A1 | 5/2011 | Wakamoto et al. | |
| 2014/0360218 A1 | 12/2014 | Takenaka et al. | |
| 2016/0320105 A1 | 11/2016 | Okazaki | |
| 2019/0024951 A1 | 1/2019 | Nishiyama et al. | |
| 2020/0370808 A1 * | 11/2020 | Feng | F25B 30/02 |

FOREIGN PATENT DOCUMENTS

| | | | | |
|---|---|---|---|---|
| EP | 2 428 741 A1 | 3/2012 | | |
| EP | 2 428 749 A1 | 3/2012 | | |
| EP | 2428741 A1 * | 3/2012 | ............. | F24F 11/84 |
| JP | 5-5406 Y2 | 2/1993 | | |
| JP | 7-280375 A | 10/1995 | | |
| JP | 9-133443 A | 5/1997 | | |
| JP | 2718286 B2 | 2/1998 | | |
| JP | 10-306949 A | 11/1998 | | |
| JP | 2000-130877 A | 5/2000 | | |
| JP | 2000-161805 A | 6/2000 | | |
| JP | 2015-158326 A | 9/2015 | | |
| WO | 2009/133644 A1 | 11/2009 | | |
| WO | 2013/111176 A1 | 8/2013 | | |
| WO | 2015/111175 A1 | 7/2015 | | |
| WO | 2017/145219 A1 | 8/2017 | | |

OTHER PUBLICATIONS

Office Action dated Jun. 21, 2023 in corresponding European Patent Application No. 19917201.6, 5 pages.
International Search Report and Written Opinion dated Apr. 23, 2019, received for PCT Application PCT/JP2019/007629, Filed on Feb. 27, 2019, 14 pages including English Translation.
Notice of Reasons for Refusal dated Aug. 27, 2019, received for JP Application 2019-536605, 16 pages including English Translation.

* cited by examiner

AIR-CONDITIONING APPARATUS

CROSS-REFERENCE TO RELATED APPLICATION

The present application is based on PCT filing PCT/JP2019/007629, filed Feb. 27, 2019, the entire contents of which are incorporated herein by reference.

TECHNICAL FIELD

The present disclosure relates to air-conditioning apparatuses. More specifically, the present disclosure relates to a multi-chamber air-conditioning apparatus to be applied to a multi-air conditioner for a building.

BACKGROUND ART

In the related art, there is an air-conditioning apparatus capable of keeping a direction of refrigerant flowing through a heat exchanger constant in both a cooling operation and a heating operation. In such an air-conditioning apparatus, the heat exchange efficiency is improved by providing a counter flow direction in which the refrigerant flow direction is opposite to the air flow direction (see, for example, Patent Literature 1 and Patent Literature 2).

A multi-chamber air-conditioning apparatus is also known in which one outdoor unit and a plurality of indoor units are connected by pipes. Known examples of the multi-chamber air-conditioning apparatus include an air-conditioning apparatus in which each of the indoor units individually operates or stops operating and an operating indoor unit operates in either cooling or heating mode, and an air-conditioning apparatus in which each of the indoor units individually operates or stops operating and an operating indoor unit can select cooling or heating (see, for example, Patent Literature 3).

CITATION LIST

Patent Literature

Patent Literature 1: Japanese Unexamined Patent Application Publication No. 2015-158326
Patent Literature 2: Japanese Examined Utility Model Registration Application Publication No. 05-005406
Patent Literature 3: Japanese Patent No. 2718286

SUMMARY OF INVENTION

Technical Problem

The configuration of the air-conditioning apparatus of the related art can keep the refrigerant flow directions in an outdoor heat exchanger and an indoor heat exchanger constant regardless of the operating state. However, no reference is made to a configuration to be applied to a multi-chamber air-conditioning apparatus. Each indoor unit of a multi-chamber air-conditioning apparatus is typically provided with, in addition to an indoor heat exchanger in the configuration of the related art, a pressure reducing valve to individually operate the indoor unit. A flow path is switched such that the refrigerant flows through the indoor heat exchanger and the pressure reducing valve in this order during the cooling operation and the refrigerant flows through the pressure reducing valve and the indoor heat exchanger in this order during the heating operation. In a case where the refrigerant flow direction is kept constant regardless of the cooling operation and heating operation in the configuration of the related art, the positional relationship between the pressure reducing valve and the indoor heat exchanger is opposite to that in a typical heating circuit during the heating operation. Thus, the following problem occurs: During the heating operation, a discharge gas from a compressor passes through a flow control valve of an indoor unit, causing a large pressure loss, resulting in a reduction in system efficiency.

To address the problem described above, the present disclosure provides an air-conditioning apparatus including a plurality of indoor units that individually perform cooling or heating operation, in which refrigerant flow directions in the indoor units are constant regardless of the cooling or heating operation and high efficiency can be achieved.

Solution to Problem

An air-conditioning apparatus according to an embodiment of the present disclosure includes a primary-side circuit in which a compressor that compresses refrigerant, a first flow switching device that switches a circulation path of the refrigerant, an outdoor heat exchanger that exchanges heat between the refrigerant and a heat-source-side fluid, a second flow switching device that switches the circulation path of the refrigerant, a first expansion device that adjusts a pressure of the refrigerant, and a relay heat exchanger that exchanges heat between the refrigerant and a heat medium different from the refrigerant are connected by pipes and in which the refrigerant circulates; a secondary-side circuit in which the relay heat exchanger, a pump that pressurizes the heat medium, a plurality of indoor heat exchangers, each of which exchanges heat between the heat medium and air for an air-conditioning target space, and heat medium flow control devices, each of which is installed in such a manner as to correspond to an indoor heat exchanger among the indoor heat exchangers and adjusts a flow rate of the heat medium passing through the indoor heat exchanger, are connected by pipes and in which the heat medium circulates; and a controller configured to control the first flow switching device and the second flow switching device to provide the circulation path such that in a cooling operation and a heating operation, the refrigerant and the heat-source-side fluid flow through the outdoor heat exchanger in opposite directions and the refrigerant flows through the relay heat exchanger in a constant direction. The pump is installed such that the heat medium flows through the relay heat exchanger in a direction opposite to the direction in which the refrigerant flows and the heat medium and the air for the air-conditioning target space flow through each of the plurality of indoor heat exchangers in opposite directions.

Advantageous Effects of Invention

An embodiment of the present disclosure can provide an air-conditioning apparatus in which each heat exchanger has a counter flow direction in which the refrigerant flow directions of two heat exchange targets are opposite in either cooling or heating operation, thereby improving heat exchange efficiency and increasing system efficiency. In addition, an air-conditioning apparatus of a cooling/heating switching type and an air-conditioning apparatus of a cooling and heating simultaneous operation type have a common outdoor unit and indoor units, thereby reducing cost.

DESCRIPTION OF EMBODIMENTS

Figure 1:
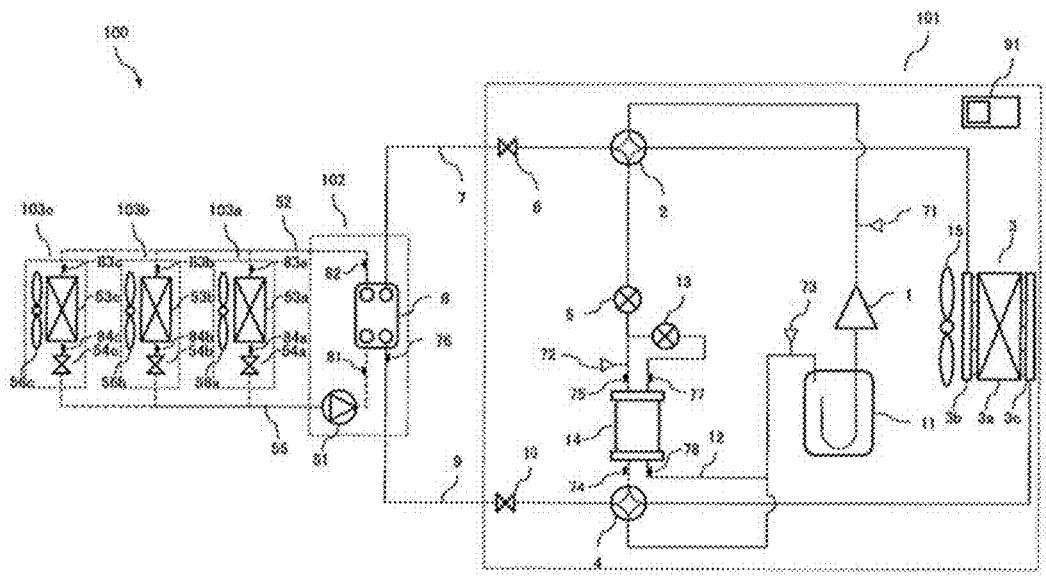
FIG. 1 is a diagram schematically illustrating an example configuration of circuits and other devices in an air-conditioning apparatus according to Embodiment 1 of the present disclosure.

Hereinafter, an air-conditioning apparatus according to an embodiment of the disclosure will be described with reference to the drawings. In the following drawings, including FIG. 1, components denoted by the same numerals are the same or equivalent components and are common throughout the following embodiments. The forms of the constituent elements presented throughout the specification are merely examples and are not limited to the forms described in the specification. In particular, the combination of constituent elements is not limited to only the combination in each embodiment, and constituent elements described in other embodiments may be applied in different embodiments. In the drawings, the relationship between the sizes of the constituent members may differ from the actual one. High and low levels of the temperature, the pressure, and other parameters are not determined in relation to absolute values, but are relatively determined in states, operations, and other factors in the apparatus, the devices, and other equipment.

Embodiment 1

<Air-Conditioning Apparatus>

FIG. 1 is a diagram schematically illustrating an example configuration of circuits and other devices in an air-conditioning apparatus according to Embodiment 1 of the present disclosure. An air-conditioning apparatus 100 in an example of Embodiment 1 includes, as separate units, an outdoor unit 101, a relay unit 102 serving as a relay device that exchanges heat between a primary-side heat medium, which is a medium that transports heat, and a secondary-side heat medium different from the primary-side heat medium to relay heat transfer, and a plurality of indoor units 103. The air-conditioning apparatus 100 further includes a primary-side circuit that is a refrigerant cycle circuit formed by connecting the outdoor unit 101 and the relay unit 102 to each other by a primary-side outgoing pipe 7 and a primary-side return pipe 9. The air-conditioning apparatus 100 further includes a secondary-side circuit that is a heat medium circulation circuit formed by connecting the relay unit 102 and the indoor units 103 to each other by a secondary-side outgoing pipe 52 and a secondary-side return pipe 55. FIG. 1 illustrates an example in which three indoor units, namely, an indoor unit 103a, an indoor unit 103b, and an indoor unit 103c, are connected to the relay unit 102. However, the number of indoor units 103 is not limited to three, and two or more multiple indoor units 103 may be used.

<Heat Medium>

The primary-side heat medium flowing through the primary-side circuit supplies heat from the outdoor unit 101 to the relay unit 102 or from the relay unit 102 to the outdoor unit 101. In Embodiment 1 and other embodiments, the primary-side heat medium is refrigerant, and, for example, a non-azeotropic refrigerant mixture, which is produced by mixing a plurality of types of refrigerants having different boiling points and has a difference between a temperature (boiling point) at which evaporation starts under a certain pressure and a temperature (dew point) at which evaporation ends, is used. In the following description, a non-azeotropic refrigerant mixture is used. However, a non-azeotropic refrigerant mixture is not limiting, and single-component refrigerant, an azeotropic refrigerant mixture, a near-azeotropic refrigerant mixture, or any other type of refrigerant may be used.

The secondary-side heat medium flowing through the secondary-side circuit supplies heat from the relay unit 102 to the indoor units 103 or from the indoor units 103 to the relay unit 102. In Embodiment 1 and other embodiments, the secondary-side heat medium is simply referred to as a heat medium. In the following description, water is used as the heat medium. However, water is not limiting, and refrigerant, antifreeze, or any other medium may be used.

<Outdoor Unit 101>

The outdoor unit 101 is, for example, a heat source unit installed outside a room serving as an air-conditioning target space and configured to discharge or supply heat for air conditioning to the outside. The outdoor unit 101 is provided with, for example, a compressor 1, a first flow switching device 2, an outdoor heat exchanger 3, a second flow switching device 4, a first expansion device 5, an accumulator 11, a bypass pipe 12, a bypass expansion device 13, and a refrigerant-refrigerant heat exchanger 14, and these devices are connected by pipes. The outdoor unit 101 is also provided with an outdoor fan 15, which is an air-sending device that sends air to the outdoor heat exchanger 3.

The compressor 1 sucks the refrigerant, compresses the refrigerant into a high-temperature and high-pressure state, and discharges the resulting refrigerant. The compressor 1 of Embodiment 1 is constituted by, for example, a capacity-controllable inverter compressor or any other compressor. Examples of the compressor 1 of Embodiment 1 may include a compressor having a low-pressure shell structure, and a compressor having a high-pressure shell structure. The low-pressure shell structure is a structure in which a hermetic container includes a compression chamber and a low-pressure refrigerant pressure atmosphere is created in the hermetic container such that the low-pressure refrigerant in the hermetic container is sucked into the compression chamber and is compressed. The high-pressure shell structure is a structure in which a high-pressure refrigerant pressure atmosphere is created in the hermetic container such that low-pressure refrigerant in a pipe connected to a compressor suction portion is sucked into the compression chamber, compressed, and discharged through the inside of the hermetic container.

The first flow switching device 2 is constituted by, for example, a four-way valve or any other device. The first flow switching device 2 is a device that switches between a circulation path of the refrigerant in a cooling operation and a circulation path of the refrigerant in a heating operation to switch a heat exchanger that is to act as a condenser or a gas cooler. The first flow switching device 2 is connected to the discharge side of the compressor 1, the outdoor heat exchanger 3, the first expansion device 5, and the primary-side outgoing pipe 7. During the cooling operation, the first flow switching device 2 switches the flow path of the refrigerant cycle circuit to a cooling flow path so that the discharge side of the compressor 1 and the outdoor heat exchanger 3 communicate and the first expansion device 5 and the primary-side outgoing pipe 7 communicate. In the case of the cooling flow path, the outdoor heat exchanger 3 acts as a condenser or a gas cooler. During the heating operation, on the other hand, the first flow switching device 2 switches the flow path of the refrigerant cycle circuit to a heating flow path so that the discharge side of the compressor 1 and the primary-side outgoing pipe 7 communicate and the outdoor heat exchanger 3 and the first expansion device 5 communicate. In the case of the heating flow path, a relay heat exchanger 8 acts as a condenser or a gas cooler.

The outdoor heat exchanger 3 is constituted by an inlet-side distributor 3b such as a header, a heat exchanger core 3a such as a fin-tube heat exchanger, and an outlet-side distributor 3c such as a header. The outdoor heat exchanger 3 exchanges heat between outdoor air supplied from the outdoor fan 15 and the refrigerant. The outdoor heat exchanger 3 is connected to the first flow switching device 2 on the refrigerant inflow side and is connected to the second flow switching device 4 on the refrigerant outflow side. During the cooling operation, high-temperature refrigerant flows through the inlet-side distributor 3b, the heat exchanger core 3a, and the outlet-side distributor 3c in this order, and air having a lower temperature than the refrigerant flows in a direction opposite to that of the refrigerant, that is, in a counter flow direction. The outdoor heat exchanger 3 functions as a condenser or a gas cooler. During the heating operation, low-temperature refrigerant flows through the inlet-side distributor 3b, the heat exchanger core 3a, and the outlet-side distributor 3c in this order, and air having a higher temperature than the refrigerant flows in a counter flow direction. The outdoor heat exchanger 3 functions as an evaporator. In the following description, the outdoor heat exchanger 3 is a fin-tube heat exchanger. However, the outdoor heat exchanger 3 is not limited to a fin-tube heat exchanger, and may be a plate heat exchanger or any other type of heat exchanger. The heat-source-side fluid that exchanges heat with the refrigerant in the outdoor heat exchanger 3 is outdoor air, but is not limited to this.

The second flow switching device 4 is constituted by, for example, a four-way valve or any other device. The second flow switching device 4 is a device that switches between a circulation path of the refrigerant in a cooling operation and a circulation path of the refrigerant in a heating operation to switch a heat exchanger that is to act as an evaporator. The second flow switching device 4 is connected to the suction side of the compressor 1, the outdoor heat exchanger 3, the first expansion device 5, and the primary-side return pipe 9. During the cooling operation, the second flow switching device 4 switches the flow path of the refrigerant cycle circuit to the cooling flow path so that the suction side of the compressor 1 and the primary-side return pipe 9 communicate and the outdoor heat exchanger 3 and the first expansion device 5 communicate. In the case of the cooling flow path, the relay heat exchanger 8 acts as an evaporator. During the heating operation, in contrast, the second flow switching device 4 switches the flow path of the refrigerant cycle circuit to the heating flow path so that the suction side of the compressor 1 and the outdoor heat exchanger 3 communicate and the first expansion device 5 and the primary-side return pipe 9 communicate. In the case of the heating flow path, the outdoor heat exchanger 3 acts as an evaporator. In Embodiment 1, the second flow switching device 4 is constituted by, for example, a four-way valve or any other device. The second flow switching device 4 may be configured as a combination of two-way valves, for example.

The first expansion device 5 is a device having a function as a pressure reducing valve or an expansion valve that reduces the pressure of the refrigerant or expands the refrigerant. The first expansion device 5 is desirably configured as a device whose opening degree is controllable, such as an electronic expansion valve. The first expansion device 5 is disposed at a pipe between the first flow switching device 2 and the second flow switching device 4. The accumulator 11 is disposed at a suction portion on the suction side of the compressor 1. The accumulator 11 accumulates surplus refrigerant in the refrigerant cycle circuit. For example, the amount of refrigerant required for air conditioning during the heating operation is different from that during the cooling operation. Thus, the accumulator 11 accumulates surplus refrigerant generated due to the difference between the operations. Further, the accumulator 11 accumulates surplus refrigerant generated transiently when the operation is changed. In the air-conditioning apparatus 100 of Embodiment 1, the accumulator 11 accumulates surplus refrigerant. However, this is not limiting. For example, a receiver that accumulates high-pressure liquid refrigerant may be installed. An opening and closing device 6 and an opening and closing device 10 control passage of the refrigerant between the outdoor unit 101 and the indoor unit 103a and between the outdoor unit 101 and the indoor unit 103b. For example, if the refrigerant leaks from a portion other than the outdoor unit 101, the opening and closing device 6 and the opening and closing device 10 are closed to confine the refrigerant in the outdoor unit 101.

The bypass pipe 12 is a pipe through which part of high-temperature and high-pressure refrigerant bypasses and flows into the suction portion of the compressor 1. The bypass pipe 12 has an end connected to a pipe between the second flow switching device 4 and the first expansion device 5, and another end connected to a pipe between the compressor 1 and the second flow switching device 4. The bypass expansion device 13 is disposed at the bypass pipe 12. The bypass expansion device 13 is a device having a function as a pressure reducing valve or an expansion valve that reduces the pressure of the refrigerant or expands the refrigerant. The bypass expansion device 13 is desirably configured as a device whose opening degree is controllable, such as an electronic expansion valve.

The refrigerant-refrigerant heat exchanger 14 is constituted by a double-pipe heat exchanger or any other type of heat exchanger, for example. The refrigerant-refrigerant heat exchanger 14 exchanges heat between high-pressure refrigerant flowing between the second flow switching device 4 and the first expansion device 5 and low-pressure refrigerant that has flowed out of the bypass expansion device 13 and flows through the bypass pipe 12 to subcool the high-pressure refrigerant or perform any other operation. In the refrigerant-refrigerant heat exchanger 14, a high-pressure-side flow path is disposed at the pipe between the second flow switching device 4 and the first expansion device 5. A low-pressure-side flow path is disposed at a pipe downstream of the bypass expansion device 13 along the bypass pipe 12. During the cooling operation or the heating operation, high-pressure refrigerant flows through the refrigerant-refrigerant heat exchanger 14 in the direction from the second flow switching device 4 to the first expansion device 5, and low-pressure refrigerant flows through the refrigerant-refrigerant heat exchanger 14 in the direction from the bypass expansion device 13 to the outlet of the bypass pipe 12. Thus, the low-pressure refrigerant flows in a direction opposite to that of the high-pressure refrigerant, that is, in a counter flow direction. In the following description, the refrigerant-refrigerant heat exchanger 14 is a double-pipe heat exchanger. However, the refrigerant-refrigerant heat exchanger 14 is not limited to a double-pipe heat exchanger, and may be a plate heat exchanger or any other type of heat exchanger. In the following description, the outdoor heat exchanger 3 is a fin-tube heat exchanger. However, the outdoor heat exchanger 3 is not limited to a fin-tube heat exchanger, and may be a plate heat exchanger or any other type of heat exchanger.

The outdoor unit 101 includes a first high-pressure sensor 71, a second high-pressure sensor 72, a low-pressure sensor 73, a first liquid temperature sensor 74, a second liquid temperature sensor 75, a two-phase temperature sensor 77, and a gas temperature sensor 78. These sensors are connected to a controller 91. The first high-pressure sensor 71 is a sensor that detects the refrigerant pressure on the discharge side of the compressor 1. The first high-pressure sensor 71 is installed in a pipe connected to the discharge side of the compressor 1. The second high-pressure sensor 72 is a sensor that detects the refrigerant pressure on the inlet side of the first expansion device 5. The second high-pressure sensor 72 is installed in a pipe connected to the inlet side of the first expansion device 5. The low-pressure sensor 73 is a sensor that detects the refrigerant pressure on the suction side of the compressor 1. The low-pressure sensor 73 is installed in a pipe connected to the suction side of the compressor 1. The first liquid temperature sensor 74 is a sensor that detects the refrigerant temperature on the high-pressure inlet side of the refrigerant-refrigerant heat exchanger 14. The first liquid temperature sensor 74 is installed in a pipe connected to the high-pressure refrigerant inlet side of the refrigerant-refrigerant heat exchanger 14. The second liquid temperature sensor 75 is a sensor that detects the refrigerant temperature on the high-pressure outlet side of the refrigerant-refrigerant heat exchanger 14. The second liquid temperature sensor 75 is installed in a pipe connected to the high-pressure refrigerant outlet side of the refrigerant-refrigerant heat exchanger 14. The two-phase temperature sensor 77 is a sensor that detects the refrigerant temperature on the low-pressure inlet side of the refrigerant-refrigerant heat exchanger 14. The two-phase temperature sensor 77 is installed in a pipe connected to the low-pressure refrigerant inlet side of the refrigerant-refrigerant heat exchanger 14. The gas temperature sensor 78 is a sensor that detects the refrigerant temperature on the low-pressure outlet side of the refrigerant-refrigerant heat exchanger 14. The gas temperature sensor 78 is installed in a pipe connected to the low-pressure refrigerant outlet side of the refrigerant-refrigerant heat exchanger 14.

<Pipes>

The primary-side outgoing pipe 7 is a pipe such as a copper pipe. The primary-side outgoing pipe 7 serves as a refrigerant flow path from the outdoor unit 101 to the relay unit 102. The primary-side outgoing pipe 7 has an end connected to the first flow switching device 2, and another end connected to the relay heat exchanger 8. During the cooling operation, low-temperature and low-pressure two-phase refrigerant passes through the primary-side outgoing pipe 7. The primary-side outgoing pipe 7 is further configured such that, during the heating operation, high-temperature and high-pressure gas refrigerant passes through the primary-side outgoing pipe 7. In the following description, the primary-side outgoing pipe 7 is a copper pipe. However, the primary-side outgoing pipe 7 is not limited to a copper pipe, and may be a pipe such as a steel pipe or an aluminum pipe.

The primary-side return pipe 9 is a pipe such as a copper pipe. The primary-side return pipe 9 serves as a refrigerant flow path from the outdoor unit 101 to the relay unit 102. The primary-side return pipe 9 has an end connected to the second flow switching device 4, and another end connected to the relay heat exchanger 8. During the cooling operation, low-temperature and low-pressure two-phase or gas refrigerant passes through the primary-side return pipe 9. During the heating operation, low-temperature and high-pressure two-phase refrigerant or liquid refrigerant passes through the primary-side return pipe 9. In the following description, the primary-side return pipe 9 is a copper pipe. However, the primary-side return pipe 9 is not limited to a copper pipe, and may be a pipe such as a steel pipe or an aluminum pipe.

As described above, high-temperature and high-pressure gas refrigerant flows through the primary-side outgoing pipe 7 during the heating operation, and low-temperature and low-pressure gas refrigerant flows through the primary-side return pipe 9 during the cooling operation. The low-temperature and low-pressure gas refrigerant has a lower density than the high-temperature and high-pressure gas refrigerant. Thus, if the primary-side outgoing pipe 7 and the primary-side return pipe 9 have the same pipe diameter, during the cooling operation, pressure loss increases in the primary-side return pipe 9 through which the low-temperature and low-pressure gas refrigerant flows, and the deterioration in performance increases.

In general, a pressure loss dP [Pa] in a pipe is expressed by Equation (1) for a density ρ [kg/m³], a viscosity coefficient μ [Pa·s], a refrigerant flow rate Gr [kg/s], and a pipe inner diameter d [mm], using the Blasius equation for calculation of the coefficient of friction in a single phase. Here, f [-] is the coefficient of friction. Further, L [m] is the pipe length. Then, U [m/s] is the speed of the refrigerant.

[Math. 1]

$$dP = f\frac{L}{d}\left(\frac{1}{2}\rho U^2\right) \propto \rho^{-1} \cdot \mu^{0.25} \cdot Gr^{1.75} \cdot d^{-4.75} \quad (1)$$

Equation (1) indicates that the pressure loss dP decreases as the pipe inner diameter d increases. However, an increase in the pipe inner diameter d increases problems, such as an increase in pipe cost, deterioration in workability, and an increase in the amount of enclosed refrigerant. As indicated in Table 1 and Table 2 below, refrigerant typically has a density ratio of about 2 to 5 times, the density ratio being the ratio between the high-pressure gas density on the discharge side of the compressor 1 and the low-pressure gas density on the suction side of the compressor 1. The influence of the pressure loss in the low-pressure refrigerant on performance is about twice that of the pressure loss in the high-pressure refrigerant. It is therefore efficient to set the pipe diameter of the primary-side return pipe 9 to about 1.2 to 3.0 times the pipe diameter of the primary-side outgoing pipe 7. In Table 1 and Table 2, the numerical values were obtained based on an operation in the refrigerant cycle circuit at a condensing temperature of 50 degrees C., an evaporating temperature of 5 degrees C., a degree of superheat of 3 K on the compressor suction side, and a compressor efficiency of 70%.

TABLE 1

|  | R32 | R290 | R1123 | R1234yf | R245ca |
|---|---|---|---|---|---|
| Density ratio* [time] | 2.5 | 2.9 | 2.9 | 3.5 | 4.9 |

TABLE 2

|  | R410A | R513A | R454B | R454C | R455A |
|---|---|---|---|---|---|
| Density ratio* [time] | 2.8 | 3.5 | 2.7 | 3.3 | 3.2 |

<Relay Unit 102>

The relay unit 102 is, for example, a device installed in a machine room, above a ceiling of a room, or in any other location and configured to convert the form of transporting heat in air conditioning from refrigerant to water. The relay unit 102 includes the relay heat exchanger 8 and a pump 51.

The relay heat exchanger 8 is, for example, a plate heat exchanger and exchanges heat between the refrigerant flowing through the primary-side circuit and the water flowing through the secondary-side circuit. The relay heat exchanger 8 has a primary-side circuit inlet connected to the primary-side outgoing pipe 7, and a primary-side circuit outlet connected to the primary-side return pipe 9. Further, the relay heat exchanger 8 has a secondary-side circuit inlet connected to the discharge side of the pump 51, and a secondary-side circuit outlet connected to the secondary-side outgoing pipe 52. In the relay heat exchanger 8, during the cooling operation, low-temperature refrigerant flows from the primary-side circuit inlet toward the primary-side circuit outlet. Further, water having a higher temperature than the refrigerant flows from the secondary-side circuit inlet toward the secondary-side circuit outlet. During the heating operation, high-temperature refrigerant flows from the primary-side circuit inlet toward the primary-side circuit outlet. In the relay heat exchanger 8, further, water having a lower temperature than refrigerant flows from the secondary-side circuit inlet toward the secondary-side circuit outlet. Thus, in both operations, water flows through the relay heat exchanger 8 in a direction opposite to that of the refrigerant, that is, in a counter flow direction. In the following description, an example will be described in which a plate heat exchanger is used as the relay heat exchanger 8. However, the relay heat exchanger 8 is not limited to a plate heat exchanger, and may be a double-pipe heat exchanger or any other type of heat exchanger.

Examples of the pump 51 include an inverter-type centrifugal pump. The pump 51 sucks water, increases the pressure of the water, and delivers the water. The pump 51 has a suction side connected to the secondary-side return pipe 55, and a delivery side connected to the secondary-side circuit inlet of the relay heat exchanger 8.

The relay unit 102 includes a refrigerant outlet temperature sensor 76, a first water temperature sensor 81, and a second water temperature sensor 82. These sensors are connected to the controller 91. The refrigerant outlet temperature sensor 76 is a sensor that detects the refrigerant temperature at the refrigerant-side outlet of the relay heat exchanger 8. The refrigerant outlet temperature sensor 76 is installed in a pipe connected to the primary-side circuit outlet of the relay heat exchanger 8. The first water temperature sensor 81 is a sensor that detects the water temperature at the water-side inlet of the relay heat exchanger 8. The first water temperature sensor 81 is installed in a pipe connected to the secondary-side circuit inlet of the relay heat exchanger 8. The second water temperature sensor 82 is a sensor that detects the water temperature at the water-side outlet of the relay heat exchanger 8. The second water temperature sensor 82 is installed in a pipe connected to the secondary-side circuit outlet of the relay heat exchanger 8.

<Indoor Units 103>

The indoor units 103 (the indoor unit 103a, the indoor unit 103b, and the indoor unit 103c) are installed inside individual rooms, for example, and transfer heat for air conditioning into the rooms or receive heat from within the rooms. The indoor units 103 include indoor heat exchangers 53 (indoor heat exchanger 53a, indoor heat exchanger 53b, and indoor heat exchanger 53c) and flow control valves 54 (flow control valve 54a, flow control valve 54b, and flow control valve 54c), and these components are connected by pipes. The indoor units 103 further include indoor fans 56 (indoor fan 56a, indoor fan 56b, and indoor fan 56c).

The indoor heat exchangers 53 are, for example, fin-tube heat exchangers. The indoor heat exchangers 53 exchange heat between the air supplied from the indoor fans 56 and the water flowing through the indoor heat exchangers 53. The indoor heat exchangers 53 have an inlet side connected to the secondary-side outgoing pipe 52, and an outlet side connected to the flow control valves 54. Each of the indoor heat exchangers 53 functions as a cooler during the cooling operation, and functions as a heater during the heating operation. In the following description, each of the indoor heat exchangers 53 is a fin-tube heat exchanger. However, each of the indoor heat exchangers 53 is not limited to a fin-tube heat exchanger, and may be a plate heat exchanger or any other type of heat exchanger. Each of the flow control valves 54 is, for example, a heat medium flow control device constituted by a valve whose resistance value is variably controllable, such as a variable valve, and configured to control the flow rate of water. The flow control valves 54 have an inlet side connected to the indoor heat exchangers 53, and an outlet side connected to the secondary-side return pipe 55. In the following description, an example will be described in which each of the flow control valves 54 includes a variable valve. However, the variable valve is not limiting, and an openable and closable valve or any other valve may be used.

The indoor units 103 include indoor inlet water temperature sensors 83 (indoor inlet water temperature sensor 83a, indoor inlet water temperature sensor 83b, and indoor inlet water temperature sensor 83c), and indoor outlet water temperature sensors 84 (indoor outlet water temperature sensor 84a, indoor outlet water temperature sensor 84b, and indoor outlet water temperature sensor 84c). These sensors are connected to the controller 91. The indoor inlet water temperature sensors 83 are sensors that detect the water temperature at the inlet of the indoor heat exchangers 53. The indoor inlet water temperature sensors 83 are installed in pipes connected to the inlet side of the indoor heat exchanger 53a to the indoor heat exchanger 53c. The indoor outlet water temperature sensors 84 are sensors that detects the water temperature at the outlet of the indoor heat exchangers 53. The indoor outlet water temperature sensors 84 are installed in pipes connected to the outlet side of the indoor heat exchangers 53.

<Controller>

The controller 91 is a device that performs overall control of the air-conditioning apparatus 100. The controller 91 is configured to include, for example, an analog circuit, a digital circuit, a CPU, or a combination of two or more of these components. The controller 91 controls various apparatuses and devices based on, for example, data of physical quantities detected by the various sensors described above and instructions from an input device such as a remote control to execute operation modes described below. For example, the controller 91 controls the driving frequency of the compressor 1 in the outdoor unit 101, the rotation speed (including ON or OFF) of the outdoor fan 15, switching of the first flow switching device 2 and the second flow switching device 4, and the opening degrees of the first expansion device 5 and the bypass expansion device 13. The controller 91 further performs control such as controlling the driving frequency of the pump 51 in the relay unit 102. The controller 91 further performs control such as controlling the opening degrees of the flow control valves 54 in the indoor units 103. While FIG. 1 illustrates a case where the controller 91 is disposed at the outdoor unit 101, this is not limiting. The controller 91 may be disposed at each of the outdoor unit 101, the relay unit 102, and the indoor units 103. Alternatively, the controller 91 may be disposed at each of the plurality of indoor units 103.

<Operation Modes of Air-Conditioning Apparatus 100>

Next, operation modes executed by the air-conditioning apparatus 100 will be described. The air-conditioning apparatus 100 is capable of executing a cooling operation or a heating operation in accordance with instructions from the indoor unit 103a, the indoor unit 103b, and the indoor unit 103c. Next, the operation of the air-conditioning apparatus 100 in each operation mode will be described together with a refrigerant flow and a refrigerant state.

<Cooling Operation Mode>

Figure 2:
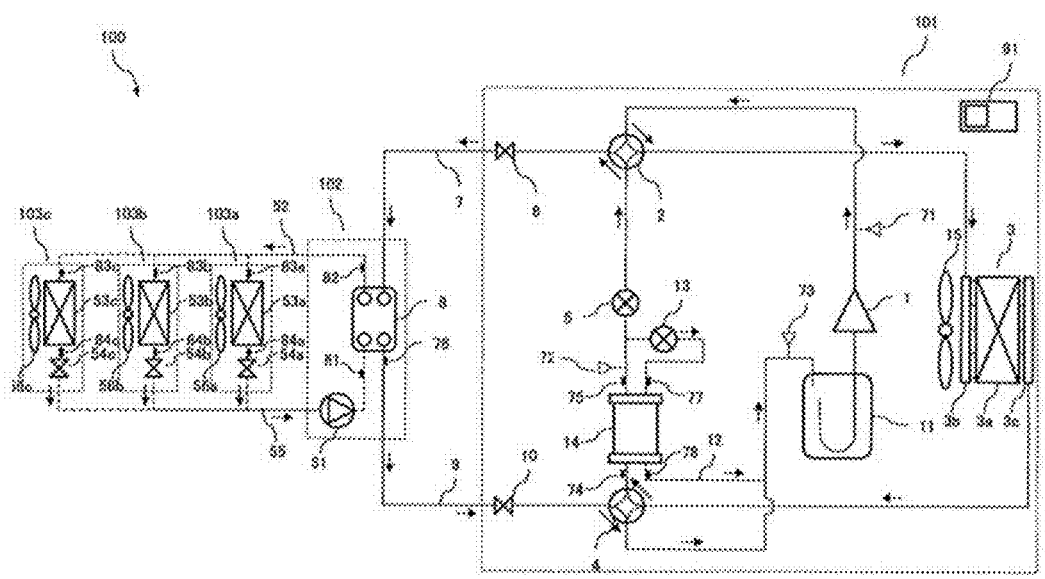
FIG. 2 is a diagram illustrating an example of a refrigerant flow and other flows during a cooling operation of the air-conditioning apparatus in Embodiment 1 of the present disclosure.

FIG. 2 is a diagram illustrating an example of a refrigerant flow and other flows during a cooling operation of the air-conditioning apparatus in Embodiment 1 of the present disclosure. The example illustrated in FIG. 2 describes a cooling operation in a cooling operation mode in which the indoor unit 103a to the indoor unit 103c perform cooling. In FIG. 2, for easy understanding, the flow direction of the refrigerant is indicated by a solid-line arrow, and the flow direction of the heat medium is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the outdoor heat exchanger 3 through the first flow switching device 2. The outdoor heat exchanger 3 exchanges heat between the outdoor air supplied from the outdoor fan 15 and the high-temperature and high-pressure gas refrigerant. The high-temperature and high-pressure gas refrigerant is cooled by heat exchange into medium-temperature and high-pressure two-phase or liquid refrigerant. The medium-temperature and high-pressure two-phase or liquid refrigerant, which is cooled by the outdoor heat exchanger 3, flows into the refrigerant-refrigerant heat exchanger 14 through the second flow switching device 4. The refrigerant-refrigerant heat exchanger 14 exchanges heat between the low-temperature and low-pressure two-phase refrigerant flowing through the bypass pipe 12 and the medium-temperature and high-pressure two-phase or liquid refrigerant flowing between the second flow switching device 4 and the first expansion device 5. The medium-temperature and high-pressure liquid refrigerant is cooled by heat exchange into low-temperature and high-pressure liquid refrigerant. The low-temperature and high-pressure liquid refrigerant, which is cooled by the refrigerant-refrigerant heat exchanger 14, flows into the first expansion device 5. The first expansion device 5 reduces the pressure of the low-temperature and high-pressure liquid refrigerant. The low-temperature and low-pressure two-phase refrigerant, whose pressure has been reduced by the first expansion device 5, flows into the relay heat exchanger 8 through the first flow switching device 2 and the primary-side outgoing pipe 7. The relay heat exchanger 8 exchanges heat between the low-temperature and low-pressure two-phase refrigerant and the heat medium circulating through the heat medium circulation circuit by the pump 51. The low-temperature and low-pressure two-phase or gas refrigerant heated by the relay heat exchanger 8 passes through the primary-side return pipe 9 and is again sucked into the compressor 1 through the second flow switching device 4 and the accumulator 11.

Part of the low-temperature and high-pressure liquid refrigerant, which branches into the bypass pipe 12, flows into the bypass expansion device 13. The bypass expansion device 13 reduces the pressure of the low-temperature and high-pressure liquid refrigerant. The low-temperature and low-pressure two-phase refrigerant, whose pressure has been reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant flowing between the second flow switching device 4 and the first expansion device 5. The low-temperature and low-pressure two-phase refrigerant or gas refrigerant heated by the refrigerant-refrigerant heat exchanger 14 flows to the suction side of the compressor 1.

Next, the operation of the devices in the secondary-side circuit will be described with reference to the flow of water. The pump 51 sucks and pressurizes water. The water delivered by the pump 51 flows into the relay heat exchanger 8. In the relay heat exchanger 8, the cooling energy of the refrigerant on the refrigerant cycle circuit side is transferred to the water, and the cooled water passes through the secondary-side outgoing pipe 52 and flows into the indoor heat exchanger 53a to the indoor heat exchanger 53c. At this time, the indoor unit 103a to the indoor unit 103c perform the cooling operation. In the indoor heat exchanger 53a to the indoor heat exchanger 53c, heat is exchanged between the indoor air respectively supplied from the indoor fan 56a to the indoor fan 56c and the low-temperature water. The indoor air is cooled. The low-temperature water becomes medium-temperature water. The medium-temperature water, which is heated by the indoor heat exchanger 53a to the indoor heat exchanger 53c, is again sucked into the pump 51 through the flow control valve 54a to the flow control valve 54c and the secondary-side return pipe 55.

<Temperature Distribution in Heat Exchangers in Cooling Operation Mode>

Figure 3:
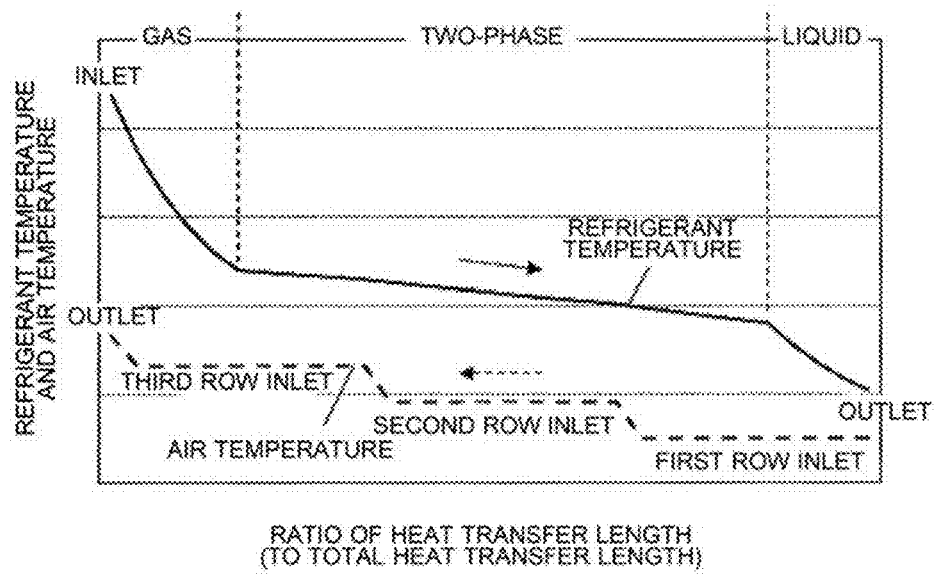
FIG. 3 is a diagram illustrating an example temperature distribution in an outdoor heat exchanger 3 during the cooling operation of the air-conditioning apparatus in Embodiment 1 of the present disclosure.

FIG. 3 is a diagram illustrating an example temperature distribution in the outdoor heat exchanger 3 during the cooling operation of the air-conditioning apparatus in Embodiment 1 of the present disclosure. The example illustrated in FIG. 3 describes a case where the outdoor heat exchanger 3 is a heat exchanger constituted by three rows (the same applies hereinafter). However, three rows are not limiting, the outdoor heat exchanger 3 having two or less rows or four or more rows may be used. In FIG. 3, the horizontal axis represents the ratio of the heat transfer length to the total heat transfer length. The vertical axis represents the refrigerant temperature and the air temperature. The total heat transfer length represents the length of a heat transfer pipe serving as a flow path through which refrigerant flows from the inlet to the outlet of a heat exchanger (the same applies hereinafter). The high-temperature and high-pressure gas refrigerant that has flowed into the outdoor heat exchanger 3 transfers heat to air having a low temperature, thereby changing the state to gas refrigerant, two-phase refrigerant, and liquid refrigerant. The refrigerant passing through the outdoor heat exchanger 3 transfers heat to air having a low temperature, and thus the state changes to gas refrigerant, two-phase refrigerant, and liquid refrigerant. The high-temperature and high-pressure gas refrigerant that has flowed into the outdoor heat exchanger 3 decreases in temperature, and becomes saturated gas refrigerant from superheated gas refrigerant. The saturated gas refrigerant decreases in temperature as condensation progresses, and becomes a saturated liquid from a saturated gas. The saturated liquid refrigerant decreases in temperature, and becomes a subcooled liquid from a saturated liquid.

Figure 4:
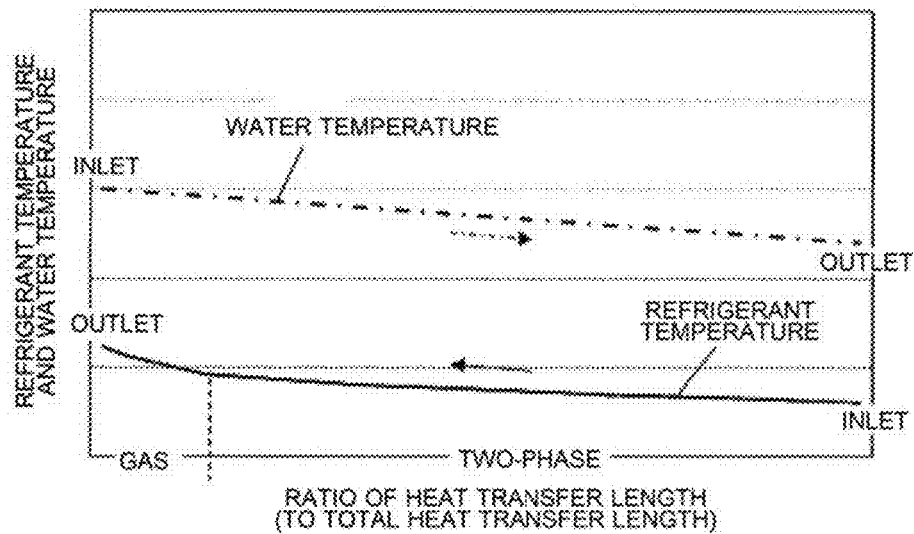
FIG. 4 is a diagram illustrating an example temperature distribution in a relay heat exchanger 8 during the cooling operation of the air-conditioning apparatus in Embodiment 1 of the present disclosure.

FIG. 4 is a diagram illustrating an example temperature distribution in the relay heat exchanger 8 during the cooling operation of the air-conditioning apparatus in Embodiment 1 of the present disclosure. In FIG. 4, the horizontal axis represents the ratio of the heat transfer length to the total heat transfer length. The vertical axis represents the refrigerant temperature and the water temperature. The low-temperature and low-pressure two-phase refrigerant that has flowed into the relay heat exchanger 8 increases in temperature as evaporation progresses, and becomes saturated gas refrigerant from the two-phase refrigerant. The saturated gas refrigerant increases in temperature, and becomes superheated gas refrigerant from the saturated gas refrigerant. On the other hand, the water flowing into the relay heat exchanger 8 decreases in temperature as heat exchange progresses.

Figure 5:
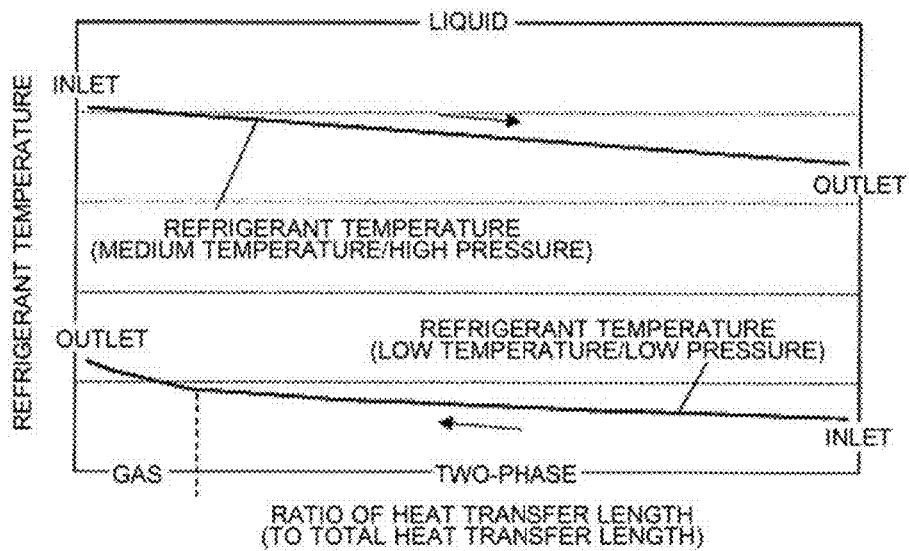
FIG. 5 is a diagram illustrating an example temperature distribution in a refrigerant-refrigerant heat exchanger 14 during the cooling operation of the air-conditioning apparatus in Embodiment 1 of the present disclosure.

FIG. 5 is a diagram illustrating an example temperature distribution in the refrigerant-refrigerant heat exchanger 14 during the cooling operation of the air-conditioning apparatus in Embodiment 1 of the present disclosure. In FIG. 5, the horizontal axis represents the ratio of the heat transfer length to the total heat transfer length. The vertical axis represents the refrigerant temperature. The medium-temperature and high-pressure liquid refrigerant that has flowed into the refrigerant-refrigerant heat exchanger 14 decreases in temperature as heat exchange progresses. The low-temperature and low-pressure two-phase refrigerant that has flowed into the refrigerant-refrigerant heat exchanger 14 increases in temperature as heat exchange progresses due to the characteristics of the non-azeotropic refrigerant mixture, and becomes gas refrigerant. If the refrigerant flowing between the second flow switching device 4 and the first expansion device 5, which passes through the refrigerant-refrigerant heat exchanger 14, is medium-temperature and high-pressure liquid refrigerant, the refrigerant transfers heat to refrigerant having a low temperature to decrease the temperature, resulting in an increase in the degree of subcooling. If the refrigerant flowing between the second flow switching device 4 and the first expansion device 5, which passes through the refrigerant-refrigerant heat exchanger 14, is two-phase refrigerant, the refrigerant transfers heat to refrigerant having a low temperature, and thus the state changes to two-phase refrigerant and liquid refrigerant. The medium-temperature and high-pressure two-phase refrigerant that has flowed into the refrigerant-refrigerant heat exchanger 14 decreases in temperature as condensation progresses, and becomes saturated liquid refrigerant from saturated gas refrigerant. The saturated liquid refrigerant decreases in temperature, and becomes subcooled liquid refrigerant from the saturated liquid. On the other hand, the refrigerant flowing through the bypass having the bypass pipe 12 passing through the refrigerant-refrigerant heat exchanger 14 receives heat from refrigerant having a high temperature, thereby changing the state to two-phase refrigerant and gas refrigerant. The low-temperature and low-pressure two-phase refrigerant that has flowed into the refrigerant-refrigerant heat exchanger 14 increases in temperature as evaporation progresses, and becomes saturated gas refrigerant from the two-phase refrigerant. The saturated gas refrigerant increases in temperature, and becomes superheated gas refrigerant from the saturated gas.

<Control in Cooling Operation Mode>

In response to a request for a cooling operation from any one of the indoor units 103a to 103c, the controller 91 switches the flow path of the first flow switching device 2 so that the discharge side of the compressor 1 and the outdoor heat exchanger 3 communicate and the first expansion device 5 and the primary-side outgoing pipe 7 communicate. In response to a request for a cooling operation from any one of the indoor units 103a to 103c, furthermore, the controller 91 switches the flow path of the second flow switching device 4 so that the suction side of the compressor 1 and the primary-side return pipe 9 communicate and the outdoor heat exchanger 3 and the first expansion device 5 communicate.

The controller 91 controls the first expansion device 5 based on the pressure detected by the low-pressure sensor 73 installed in the outdoor unit 101 and the temperature detected by the refrigerant outlet temperature sensor 76 installed in the relay unit 102. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the first expansion device 5 based on the temperature detected by the refrigerant outlet temperature sensor 76 and the relationship between the refrigerant temperature and the quality of the two-phase refrigerant or the degree of superheat of the gas refrigerant. It is desirable to control the first expansion device 5 to maintain, as control target values, a quality of 0.9 or more, at which excessive liquid return to the compressor 1 can be suppressed, and a degree of superheat of 3 K or less, at which the efficiency of the relay heat exchanger 8 can be maintained.

The controller 91 controls the bypass expansion device 13 based on the pressure detected by the low-pressure sensor 73 and the temperature detected by the gas temperature sensor 78 installed in the outdoor unit 101. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the bypass expansion device 13 based on the temperature detected by the gas temperature sensor 78 and the relationship between the refrigerant temperature and the quality of the two-phase refrigerant or the degree of superheat of the gas refrigerant. It is desirable to control the bypass expansion device 13 to maintain, as control target values, a quality of 0.9 or more, at which excessive liquid return to the compressor 1 can be suppressed, and a degree of superheat of 3 K or less, at which the efficiency of the refrigerant-refrigerant heat exchanger 14 can be maintained.

The controller 91 senses the refrigerant composition to calculate the relationship between the refrigerant temperature and the quality of the two-phase refrigerant or the degree of superheat of the gas refrigerant. The controller 91 calculates the enthalpy of the low-temperature and high-pressure liquid refrigerant that has passed through the refrigerant-refrigerant heat exchanger 14, based on the pressure detected by the second high-pressure sensor 72 and the temperature detected by the second liquid temperature sensor 75. The controller 91 further calculates the enthalpy of the low-temperature and low-pressure two-phase refrigerant that has passed through the bypass expansion device 13, based on the pressure detected by the low-pressure sensor 73 and the temperature detected by the two-phase temperature sensor 77. If the refrigerant circulates with the assumed refrigerant composition, the calculated liquid refrigerant enthalpy and two-phase refrigerant enthalpy are equal. If the refrigerant circulates with a composition different from the assumed refrigerant composition, the calculated liquid refrigerant enthalpy and two-phase refrigerant enthalpy are not equal. In this case, the assumed refrigerant composition is reviewed so that the liquid refrigerant enthalpy and the two-phase refrigerant enthalpy become equal. Accordingly, the circulating refrigerant composition can be sensed.

<Heating Operation Mode>

Figure 6:
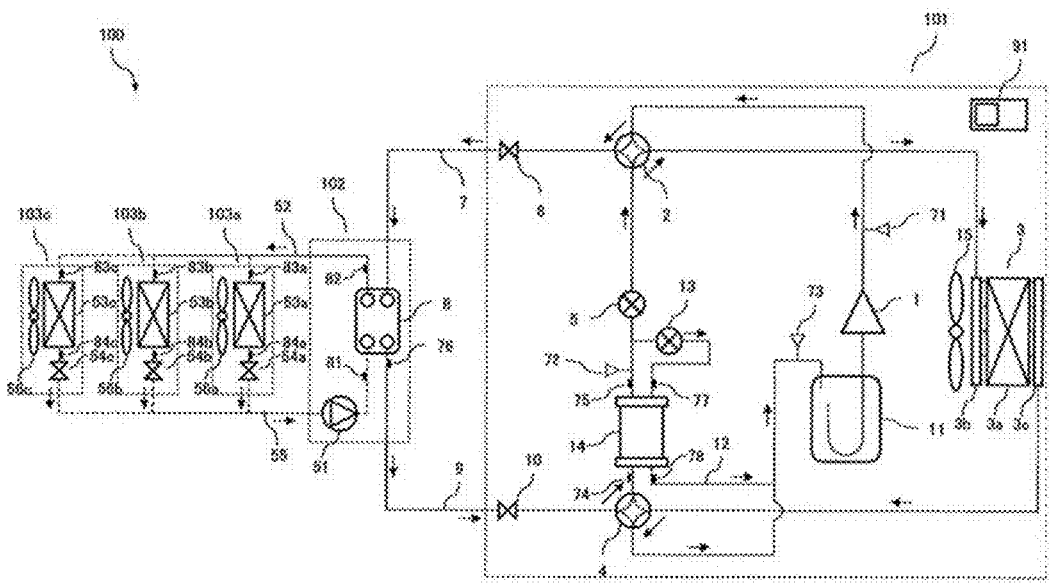
FIG. 6 is a diagram illustrating an example of a refrigerant flow and other flows during a heating operation of the air-conditioning apparatus in Embodiment 1 of the present disclosure.

FIG. 6 is a diagram illustrating an example of a refrigerant flow and other flows during a heating operation of the air-conditioning apparatus in Embodiment 1 of the present disclosure. The example illustrated in FIG. 6 describes a heating operation mode in which the indoor unit 103a to the indoor unit 103c perform heating. In FIG. 6, for easy understanding of Embodiment 1, the flow direction of the refrigerant is indicated by a solid-line arrow, and the flow direction of water is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the relay heat exchanger 8 through the first flow switching device 2 and the primary-side outgoing pipe 7. The relay heat exchanger 8 exchanges heat between the high-temperature and high-pressure gas refrigerant and water circulating in the secondary-side circuit by the pump 51. The high-temperature and high-pressure gas refrigerant is cooled by heat exchange into medium-temperature and high-pressure two-phase refrigerant or liquid refrigerant. The two-phase refrigerant or liquid refrigerant cooled by the relay heat exchanger 8 flows into the refrigerant-refrigerant heat exchanger 14 through the primary-side return pipe 9 and the second flow switching device 4. The refrigerant-refrigerant heat exchanger 14 exchanges heat between the low-temperature and low-pressure two-phase refrigerant flowing through the bypass having the bypass pipe 12 and the medium-temperature and high-pressure two-phase or liquid refrigerant flowing between the second flow switching device 4 and the first expansion device 5. The low-temperature and high-pressure liquid refrigerant cooled in the refrigerant-refrigerant heat exchanger 14 flows into the first expansion device 5. The first expansion device 5 reduces the pressure of the low-temperature and high-pressure liquid refrigerant. The low-temperature and low-pressure two-phase refrigerant, whose pressure has been reduced by the first expansion device 5, flows into the outdoor heat exchanger 3 through the first flow switching device 2. The outdoor heat exchanger 3 exchanges heat between the outdoor air supplied from the outdoor fan 15 and the low-temperature and low-pressure two-phase refrigerant. The low-temperature and low-pressure two-phase refrigerant or gas refrigerant heated by the outdoor heat exchanger 3 is again sucked into the compressor 1 through the second flow switching device 4 and the accumulator 11.

Part of the low-temperature and high-pressure liquid refrigerant, which branches into the bypass pipe 12, flows into the bypass expansion device 13. The bypass expansion device 13 reduces the pressure of the low-temperature and high-pressure liquid refrigerant. The low-temperature and low-pressure two-phase refrigerant, whose pressure has been reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant or liquid refrigerant flowing between the second flow switching device 4 and the first expansion device 5. The low-temperature and low-pressure two-phase refrigerant or gas refrigerant heated by the refrigerant-refrigerant heat exchanger 14 flows to the suction side of the compressor 1.

Next, the operation of the devices in the secondary-side circuit will be described with reference to the flow of water. The pump 51 sucks and delivers water. The water delivered by the pump 51 flows into the relay heat exchanger 8. In the relay heat exchanger 8, the heating energy of the refrigerant on the primary-side circuit side is transferred to the water, and the heated water passes through the secondary-side outgoing pipe 52 and flows into the indoor heat exchanger 53*a* and the indoor heat exchanger 53*b*. At this time, the indoor unit 103*a* to the indoor unit 103*c* perform the heating operation. In the indoor heat exchanger 53*a* to the indoor heat exchanger 53*c*, heat is exchanged between the indoor air supplied from the indoor fan 56*a* to the indoor fan 56*c* and the high-temperature water. At this time, the indoor air is heated. The high-temperature water becomes medium-temperature water. The medium-temperature water, which is cooled by the indoor heat exchanger 53*a* to the indoor heat exchanger 53*c*, is again sucked into the pump 51 through the flow control valve 54*a* to the flow control valve 54*c* and the secondary-side return pipe 55.

<Temperature Distribution in Heat Exchangers in Heating Operation Mode>

Figure 7:
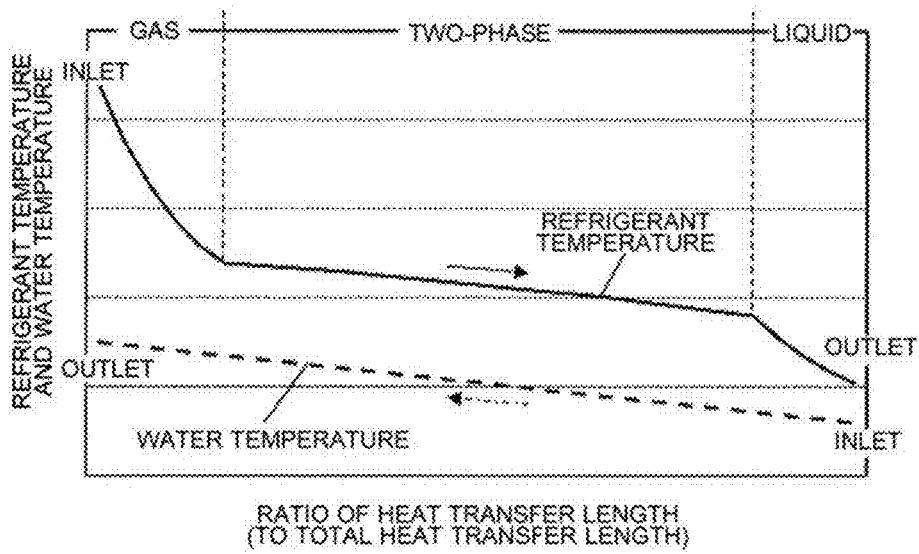
FIG. 7 is a diagram illustrating an example temperature distribution in the relay heat exchanger during the heating operation of the air-conditioning apparatus in Embodiment 1 of the present disclosure.

FIG. 7 is a diagram illustrating an example temperature distribution in the relay heat exchanger 8 during the heating operation of the air-conditioning apparatus in Embodiment 1 of the present disclosure. In FIG. 7, the horizontal axis represents the ratio of the heat transfer length to the total heat transfer length. The vertical axis represents the refrigerant temperature and the water temperature. The refrigerant passing through the relay heat exchanger 8 transfers heat to water having a low temperature, thereby changing the state to gas refrigerant, two-phase refrigerant, and liquid refrigerant. The high-temperature and high-pressure gas refrigerant that has flowed into the relay heat exchanger 8 decreases in temperature, and becomes saturated gas refrigerant from superheated gas refrigerant. The saturated gas refrigerant decreases in temperature as condensation progresses, and becomes saturated liquid refrigerant from the saturated gas refrigerant. The saturated liquid refrigerant decreases in temperature, and becomes subcooled liquid refrigerant from the saturated liquid refrigerant.

Figure 8:
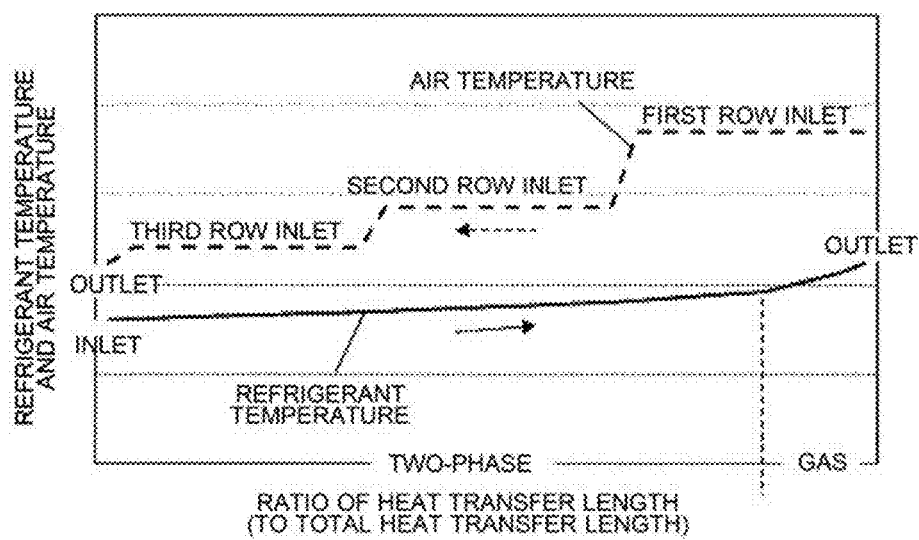
FIG. 8 is a diagram illustrating an example temperature distribution in the outdoor heat exchanger 3 during the heating operation of the air-conditioning apparatus in Embodiment 1 of the present disclosure.

FIG. 8 is a diagram illustrating an example temperature distribution in the outdoor heat exchanger 3 during the heating operation of the air-conditioning apparatus in Embodiment 1 of the present disclosure. In FIG. 8, the horizontal axis represents the ratio of the heat transfer length to the total heat transfer length. The vertical axis represents the refrigerant temperature and the air temperature. The refrigerant passing through the outdoor heat exchanger 3 receives heat from air having a high temperature, thereby changing the state to two-phase refrigerant and gas refrigerant. The low-temperature and low-pressure two-phase refrigerant that has flowed into the outdoor heat exchanger 3 increases in temperature as evaporation progresses, and becomes saturated gas refrigerant from the two-phase refrigerant. The saturated gas refrigerant increases in temperature, and becomes superheated gas refrigerant from the saturated gas.

The temperature distribution in the refrigerant-refrigerant heat exchanger 14 in the heating operation mode is similar to the temperature distribution in the refrigerant-refrigerant heat exchanger 14 in the cooling operation mode.

<Control in Heating Operation Mode>

In response to a request for a heating operation from any one of the indoor units 103*a* to 103*c*, the controller 91 switches the first flow switching device 2 so that the discharge side of the compressor 1 and the primary-side outgoing pipe 7 communicate and the outdoor heat exchanger 3 and the first expansion device 5 communicate. In response to a request for a heating operation from any one of the indoor units 103*a* to 103*c*, furthermore, the controller 91 switches the second flow switching device 4 so that the suction side of the compressor 1 and the outdoor heat exchanger 3 communicate and the first expansion device 5 and the primary-side return pipe 9 communicate.

The controller 91 controls the first expansion device 5 based on the pressure detected by the first high-pressure sensor 71 installed in the outdoor unit 101 and the temperature detected by the refrigerant outlet temperature sensor 76 installed in the relay unit 102 or the first liquid temperature sensor 74 installed in the outdoor unit 101. The controller 91 calculates the relationship between the refrigerant temperature and the quality of the two-phase refrigerant or the degree of subcooling of the liquid refrigerant, based on the pressure detected by the first high-pressure sensor 71. In a case where the refrigerant is a non-azeotropic refrigerant mixture, the temperature decreases as condensation progresses. Thus, the temperature is measured to determine the quality of the two-phase refrigerant. The controller 91 controls the first expansion device 5 based on the temperature detected by the refrigerant outlet temperature sensor 76 or the first liquid temperature sensor 74 and the relationship between the refrigerant temperature and the quality of the two-phase refrigerant or the degree of subcooling of the liquid refrigerant. It is desirable to control the first expansion device 5 to maintain, as control target values, a quality of 0.2 or less, at which the reduction in capacity due to the reduction in enthalpy difference can be suppressed and the increase in the amount of refrigerant in the primary-side return pipe 9 can be suppressed, and a degree of subcooling of 15 K or less, at which the efficiency of the relay heat exchanger 8 can be maintained.

The controller 91 controls the bypass expansion device 13 based on the pressure detected by the low-pressure sensor 73 and the temperature detected by the gas temperature sensor 78 installed in the outdoor unit 101. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the bypass expansion device 13 based on the temperature detected by the gas temperature sensor 78 and the relationship between the refrigerant temperature and the quality of the two-phase refrigerant or the degree of superheat of the gas refrigerant. It is desirable to control the bypass expansion device 13 to maintain, as control target values, a quality of 0.9 or more, at which excessive liquid return to the compressor 1 can be suppressed, and a degree of superheat of 3 K or less, at which the efficiency of the refrigerant-refrigerant heat exchanger 14 can be maintained.

The controller 91 senses the refrigerant composition to calculate the relationship between the refrigerant temperature and the quality of the two-phase refrigerant or the degree of superheat of the liquid refrigerant. The controller 91 calculates the enthalpy of the low-temperature and high-pressure liquid refrigerant that has passed through the refrigerant-refrigerant heat exchanger 14, based on the pressure detected by the second high-pressure sensor 72 and the temperature detected by the second liquid temperature sensor 75. The controller 91 further calculates the enthalpy of the low-temperature and low-pressure two-phase refrigerant that has passed through the bypass expansion device 13, based on the pressure detected by the low-pressure sensor 73 and the temperature detected by the two-phase temperature sensor 77. If the refrigerant circulates with the assumed refrigerant composition, the calculated liquid refrigerant enthalpy and two-phase refrigerant enthalpy are equal. If the refrigerant circulates with a composition different from the assumed refrigerant composition, the calculated liquid refrigerant enthalpy and two-phase refrigerant enthalpy are not equal. In this case, the assumed refrigerant composition is reviewed so that the liquid refrigerant enthalpy and the two-phase refrigerant enthalpy become equal. Accordingly, the circulating refrigerant composition can be sensed.

<Effect of Air-Conditioning Apparatus Capable of Cooling/Heating Switching Operation>

As described above, the air-conditioning apparatus 100 of Embodiment 1 includes the first flow switching device 2 and the second flow switching device 4. The controller 91 switches the flow path between the cooling operation and the heating operation using the first flow switching device 2 and the second flow switching device 4. Thus, in both the cooling operation and the heating operation, air, water, and refrigerant, which are target media to be subjected to heat exchange with the refrigerant in the respective heat exchangers, namely, the outdoor heat exchanger 3, the relay heat exchanger 8, and the refrigerant-refrigerant heat exchanger 14, can be made to flow in a counter flow direction in which the refrigerant flow direction is opposite to the direction of the flow of the target media. This avoids an approach between the temperatures of the target media and the temperature of the refrigerant and ensures a temperature difference required for heat exchange, thereby making it possible to improve heat exchange efficiency.

Furthermore, in the refrigerant-refrigerant heat exchanger 14, in both the cooling operation and the heating operation, heat is exchanged between the medium-temperature and high-pressure two-phase or liquid refrigerant flowing between the second flow switching device 4 and the first expansion device 5 and the low-temperature and low-pressure two-phase refrigerant flowing through the bypass having the bypass pipe 12. It is therefore possible to decrease the pressure loss of the refrigerant flowing from the first flow switching device 2 to the second flow switching device 4 during the cooling operation and to decrease the pressure loss of the refrigerant flowing from the first flow switching device 2 to the second flow switching device 4 during the heating operation.

In addition, the first expansion device 5 installed in the outdoor unit 101 is positioned upstream of the relay heat exchanger 8 during the cooling operation, and is positioned downstream of the relay heat exchanger 8 during the heating operation such that the relay heat exchanger 8 acts as an evaporator and a condenser in the cooling operation and the heating operation, respectively. Accordingly, the positional relationship between the first expansion device 5 and the relay heat exchanger 8 during the heating operation is the same as that in a typical heating circuit. This can suppress the reduction in pressure loss generated by the discharge gas from the compressor 1 passing through expansion devices of the indoor units 103 during heating, that is, the reduction in system efficiency.

Further, the relay heat exchanger 8 installed in the relay unit 102 exchanges heat between the refrigerant flowing through the primary-side circuit and the water flowing through the secondary-side circuit. Then, the water subjected to heat exchange is supplied to the indoor unit 103a to the indoor unit 103c installed in the secondary-side circuit. This can make the refrigerant flow direction constant in both the cooling operation and the heating operation. This allows the plurality of indoor units 103 to individually operate or stop operating while maintaining the performance in the secondary-side circuit, and can implement a multi-chamber cooling/heating switching operation in which an operating indoor unit 103 operates in either cooling or heating mode.

Embodiment 2

Figure 9:
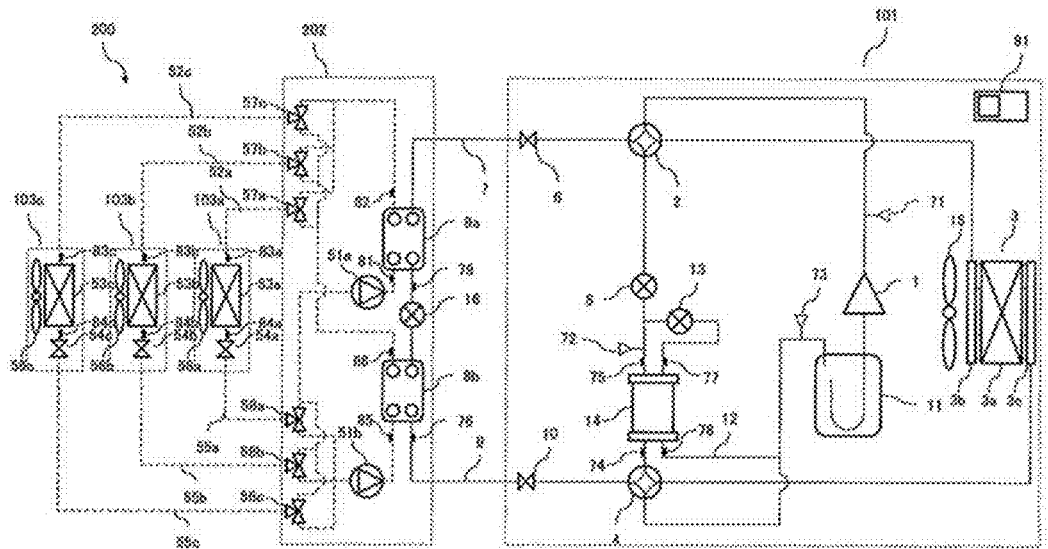
FIG. 9 is a diagram schematically illustrating an example configuration of circuits and other devices in an air-conditioning apparatus according to Embodiment 2 of the present disclosure.

FIG. 9 is a diagram schematically illustrating an example configuration of circuits and other devices in an air-conditioning apparatus according to Embodiment 2 of the present disclosure. An air-conditioning apparatus 200 in FIG. 9 is different from the air-conditioning apparatus 100 in FIG. 1 in the configuration of a relay unit 202. The air-conditioning apparatus 200 of Embodiment 2 is an air-conditioning apparatus capable of a cooling and heating simultaneous operation in which each of the indoor units 103 individually operates or stops operating and an operating indoor unit 103 selects cooling or heating. In Embodiment 2, differences from the air-conditioning apparatus 100 of Embodiment 1 will be mainly described, and devices and other equipment that perform operations and the like similar to those of the devices and other equipment described above in Embodiment 1 are denoted by the same numerals.

<Relay Unit 202>

The relay unit 202 includes a first relay heat exchanger 8a, a second relay heat exchanger 8b, a second expansion device 16, a first pump 51a, a second pump 51b, a first flow switching valve 57a to a first flow switching valve 57c, and a second flow switching valve 58a to a second flow switching valve 58c.

The first relay heat exchanger 8a is, for example, a plate heat exchanger. The first relay heat exchanger 8a exchanges heat between the refrigerant flowing through the primary-side circuit and the water flowing through the secondary-side circuit. The first relay heat exchanger 8a has a primary-side circuit inlet connected to the primary-side outgoing pipe 7, and a primary-side circuit outlet connected to the second expansion device 16. Further, the first relay heat exchanger 8a has a secondary-side circuit inlet connected to the discharge side of the first pump 51a, and a secondary-side circuit outlet connected to the first flow switching valve 57a to the first flow switching valve 57c. In the first relay heat exchanger 8a, during the cooling operation, low-temperature refrigerant flows from the primary-side circuit inlet toward the primary-side circuit outlet. Further, water having a higher temperature than the refrigerant flows from the secondary-side circuit inlet toward the secondary-side circuit outlet. During the heating operation and the cooling and heating simultaneous operation, high-temperature refrigerant flows from the primary-side circuit inlet toward the primary-side circuit outlet. Further, water having a lower temperature than refrigerant flows from the secondary-side circuit inlet toward the secondary-side circuit outlet. Thus, in all the operations, water flows through the first relay heat exchanger 8a in a direction opposite to that of the refrigerant, that is, in a counter flow direction.

The second relay heat exchanger 8b is, for example, a plate heat exchanger and exchanges heat between the refrigerant flowing through the primary-side circuit and the water flowing through the secondary-side circuit. The second relay heat exchanger 8b has a primary-side circuit inlet connected to the second expansion device 16, and a primary-side circuit outlet connected to the primary-side return pipe 9. Further, the second relay heat exchanger 8b has a secondary-side circuit inlet connected to the discharge side of the second pump 51b, and a secondary-side circuit outlet connected to the first flow switching valve 57a to the first flow switching valve 57c. In the second relay heat exchanger 8b, during the cooling operation and the cooling and heating simultaneous operation, the low-temperature refrigerant flows from the primary-side circuit inlet toward the primary-side circuit outlet. Further, water having a higher temperature than the refrigerant flows from the secondary-side circuit inlet toward the secondary-side circuit outlet. During the heating operation, the high-temperature refrigerant flows from the primary-side circuit inlet toward the primary-side circuit outlet. Further, water having a lower temperature than refrigerant flows from the secondary-side circuit inlet toward the secondary-side circuit outlet. Thus, in all the operations, water flows through the second relay heat exchanger 8b in a direction opposite to that of the refrigerant, that is, in a counter flow direction.

Examples of the first pump 51a include an inverter-type centrifugal pump. The first pump 51a sucks water, increases the pressure of the water, and delivers the water. The first pump 51a has a suction side connected to the second flow switching valve 58a to the second flow switching valve 58c, and a delivery side connected to the secondary-side circuit inlet of the first relay heat exchanger 8a. Examples of the second pump 51b include an inverter-type centrifugal pump. The second pump 51b sucks water, increases the pressure of the water, and delivers the water. The second pump 51b has a suction side connected to the second flow switching valve 58a to the second flow switching valve 58c, and a delivery side connected to the secondary-side circuit inlet of the second relay heat exchanger 8b.

The first flow switching valve 57a, the first flow switching valve 57b, the first flow switching valve 57c, the second flow switching valve 58a, the second flow switching valve 58b, and the second flow switching valve 58c are each constituted by, for example, a three-way valve or the like. The first flow switching valve 57a to the first flow switching valve 57c and the second flow switching valve 58a to the second flow switching valve 58c are each a heat medium flow switching device that switches the connection between the first relay heat exchanger 8a and the second relay heat exchanger 8b in accordance with the operating state of a corresponding one of the indoor units 103. The first flow switching valve 57a to the first flow switching valve 57c and the second flow switching valve 58a to the second flow switching valve 58c are connected to the first relay heat exchanger 8a, the second relay heat exchanger 8b, and the indoor unit 103a to the indoor unit 103c. For an indoor unit 103 for which cooling is selected, the corresponding first flow switching valve 57 and second flow switching valve 58 are switched such that the first relay heat exchanger 8a that serves as a condenser or the second relay heat exchanger 8b, which acts as an evaporator, and the indoor unit 103 communicate. As a result, the corresponding indoor heat exchanger 53 acts as a cooler. For an indoor unit 103 for which heating is selected, the corresponding first flow switching valve 57 and second flow switching valve 58 are switched such that the first relay heat exchanger 8a or the second relay heat exchanger 8b and the indoor unit 103 communicate. As a result, the corresponding indoor heat exchanger 53 acts as a heater. In the following description, an example is presented in which three-way valves are used as the first flow switching valve 57a to the first flow switching valve 57c and the second flow switching valve 58a to the second flow switching valve 58c. However, three-way valves are not limiting. For example, combinations of four-way valves or two-way valves may be used.

The relay unit 202 includes the refrigerant outlet temperature sensor 76, a refrigerant intermediate temperature sensor 79, the first water temperature sensor 81, the second water temperature sensor 82, a third water temperature sensor 85, and a fourth water temperature sensor 86. These sensors are connected to the controller 91. The refrigerant outlet temperature sensor 76 is a sensor that detects the refrigerant temperature at the refrigerant-side outlet of the second relay heat exchanger 8b. The refrigerant outlet temperature sensor 76 is installed in a pipe connected to the primary-side circuit outlet of the second relay heat exchanger 8b. The refrigerant intermediate temperature sensor 79 is a sensor that detects the refrigerant temperature at the refrigerant-side outlet of the first relay heat exchanger 8a. The refrigerant intermediate temperature sensor 79 is installed in a pipe connected to the primary-side circuit outlet of the first relay heat exchanger 8a. The first water temperature sensor 81 is a sensor that detects the water temperature at the water-side inlet of the first relay heat exchanger 8a. The first water temperature sensor 81 is installed in a pipe connected to the secondary-side circuit inlet of the first relay heat exchanger 8a. The second water temperature sensor 82 is a sensor that detects the water temperature on the water-side outlet of the first relay heat exchanger 8a. The second water temperature sensor 82 is installed in a pipe connected to the secondary-side circuit outlet of the first relay heat exchanger 8a. The third water temperature sensor 85 is a sensor that detects the water temperature at the water-side inlet of the second relay heat exchanger 8b. The third water temperature sensor 85 is installed in a pipe connected to the secondary-side circuit inlet of the second relay heat exchanger 8b. The fourth water temperature sensor 86 is a sensor that detects the water temperature at the water-side outlet of the second relay heat exchanger 8b. The fourth water temperature sensor 86 is installed in a pipe connected to the secondary-side circuit outlet of the second relay heat exchanger 8b.

<Cooling Operation Mode>

Figure 10:
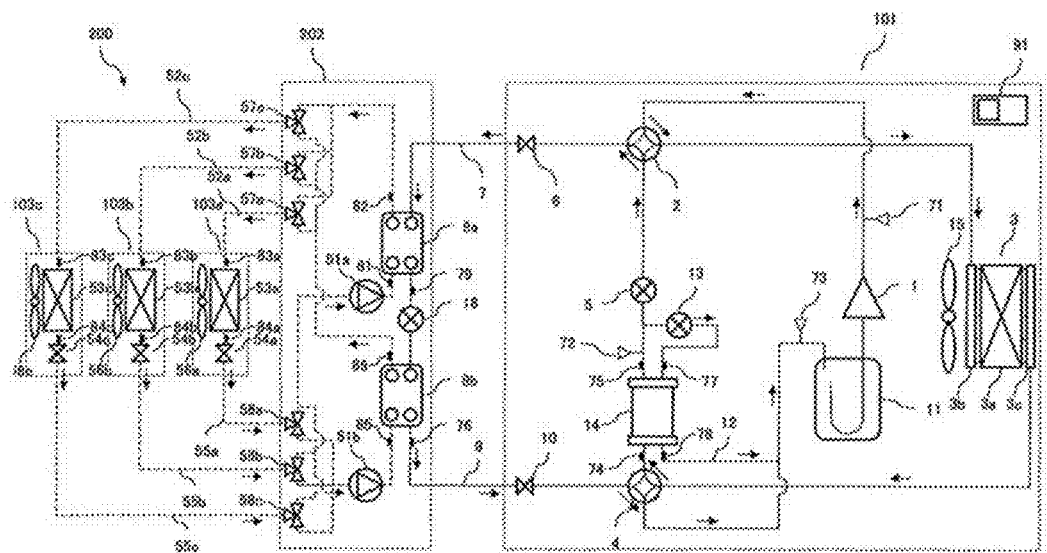
FIG. 10 is a diagram illustrating an example of a refrigerant flow and other flows during a cooling operation of the air-conditioning apparatus in Embodiment 2 of the present disclosure.

FIG. 10 is a diagram illustrating an example of a refrigerant flow and other flows during a cooling operation of the air-conditioning apparatus in Embodiment 2 of the present disclosure. The example illustrated in FIG. 10 describes a cooling operation in a cooling operation mode in which the indoor unit 103a to the indoor unit 103c perform cooling. In FIG. 10, for easy understanding, the flow direction of the refrigerant is indicated by a solid-line arrow, and the flow direction of the heat medium is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the outdoor heat exchanger 3 through the first flow switching device 2. The outdoor heat exchanger 3 exchanges heat between the outdoor air supplied from the outdoor fan 15 and the high-temperature and high-pressure gas refrigerant. The high-temperature and high-pressure gas refrigerant is cooled by heat exchange into medium-temperature and high-pressure two-phase refrigerant or liquid refrigerant. The medium-temperature and high-pressure two-phase refrigerant or liquid refrigerant, which is cooled by the outdoor heat exchanger 3, flows into the refrigerant-refrigerant heat exchanger 14 through the second flow switching device 4. The refrigerant-refrigerant heat exchanger 14 exchanges heat between the low-temperature and low-pressure two-phase refrigerant flowing through the bypass pipe 12 and the medium-temperature and high-pressure two-phase refrigerant or liquid refrigerant flowing between the second flow switching device 4 and the first expansion device 5. The medium-temperature and high-pressure two-phase refrigerant or liquid refrigerant is cooled by heat exchange into low-temperature and high-pressure liquid refrigerant. The low-temperature and high-pressure liquid refrigerant, which is cooled by the refrigerant-refrigerant heat exchanger 14, flows into the first expansion device 5. The first expansion device 5 reduces the pressure of the low-temperature and high-pressure liquid refrigerant. The low-temperature and low-pressure two-phase refrigerant, whose pressure has been reduced by the first expansion device 5, flows into the first relay heat exchanger 8a through the first flow switching device 2 and the primary-side outgoing pipe 7. The first relay heat exchanger 8a exchanges heat between the low-temperature and low-pressure two-phase refrigerant and water circulating in the secondary-side circuit by the first pump 51a. The low-temperature and low-pressure two-phase refrigerant heated by the first relay heat exchanger 8a flows into the second relay heat exchanger 8b through the second expansion device 16. The second relay heat exchanger 8b exchanges heat between the low-temperature and low-pressure two-phase refrigerant and water circulating in the secondary-side circuit by the second pump 51b. The low-temperature and low-pressure gas refrigerant heated by the second relay heat exchanger 8b passes through the primary-side return pipe 9 and is again sucked into the compressor 1 through the second flow switching device 4 and the accumulator 11.

Part of the low-temperature and high-pressure liquid refrigerant, which branches into the bypass pipe 12, flows into the bypass expansion device 13. The bypass expansion device 13 reduces the pressure of the low-temperature and high-pressure liquid refrigerant. The low-temperature and low-pressure two-phase refrigerant, whose pressure has been reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant or liquid refrigerant flowing between the second flow switching device 4 and the first expansion device 5. The low-temperature and low-pressure two-phase refrigerant or gas refrigerant heated by the refrigerant-refrigerant heat exchanger 14 flows to the suction side of the compressor 1.

Next, the operation of the devices in the secondary-side circuit will be described with reference to the flow of water. The first pump 51a and the second pump 51b suck and pressurize water. The medium-temperature water delivered by the first pump 51a and the medium-temperature water delivered by the second pump 51b flow into the first relay heat exchanger 8a and the second relay heat exchanger 8b, respectively. In the first relay heat exchanger 8a and the second relay heat exchanger 8b, the cooling energy of the refrigerant on the refrigerant cycle circuit side is transferred to the medium-temperature water, and the cooled water passes through secondary-side outgoing pipes 52 and flows into the indoor heat exchanger 53a to the indoor heat exchanger 53c. At this time, the indoor unit 103a to the indoor unit 103c perform the cooling operation. In the indoor heat exchanger 53a to the indoor heat exchanger 53c, heat is exchanged between the indoor air respectively supplied from the indoor fan 56a to the indoor fan 56c and the low-temperature water. The indoor air is cooled. The low-temperature water becomes medium-temperature water. The medium-temperature water, which is heated by the indoor heat exchanger 53a to the indoor heat exchanger 53c, is again sucked into the first pump 51a and the second pump 51b through the flow control valve 54a to the flow control valve 54c and secondary-side return pipes 55.

<Temperature Distribution in Heat Exchangers in Cooling Operation Mode>

The temperature distribution in the outdoor heat exchanger 3 during the cooling operation is similar to that in FIG. 3 described above with reference to Embodiment 1.

Figure 11:
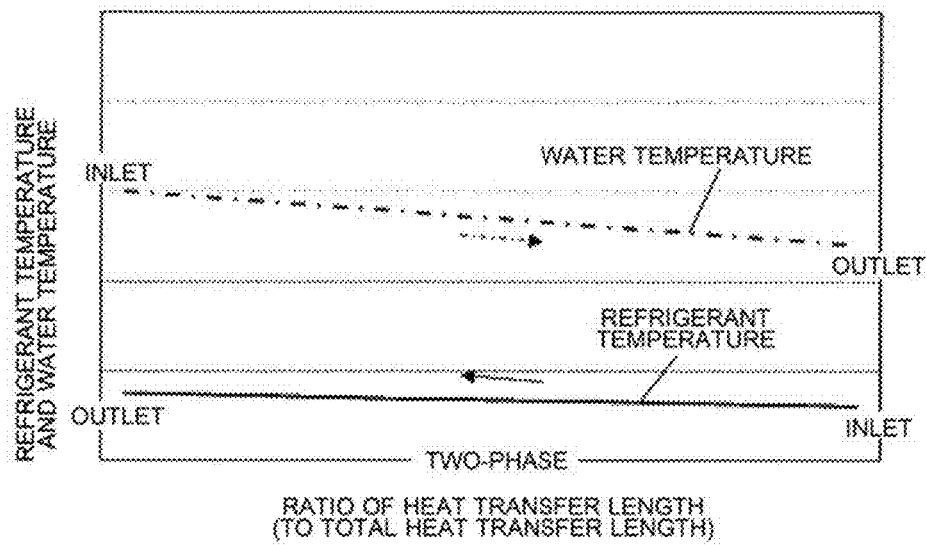
FIG. 11 is a diagram illustrating an example temperature distribution in a first relay heat exchanger during the cooling operation of the air-conditioning apparatus in Embodiment 2 of the present disclosure.

FIG. 11 is a diagram illustrating an example temperature distribution in the first relay heat exchanger during the cooling operation of the air-conditioning apparatus in Embodiment 2 of the present disclosure. In FIG. 11, the horizontal axis represents the ratio of the heat transfer length to the total heat transfer length. The vertical axis represents the refrigerant temperature and the water temperature. The refrigerant passing through the first relay heat exchanger 8a receives heat from water having a high temperature, and accordingly the quality of the two-phase refrigerant changes. The low-temperature and low-pressure two-phase refrigerant that has flowed into the first relay heat exchanger 8a increases in temperature as evaporation progresses.

Figure 12:
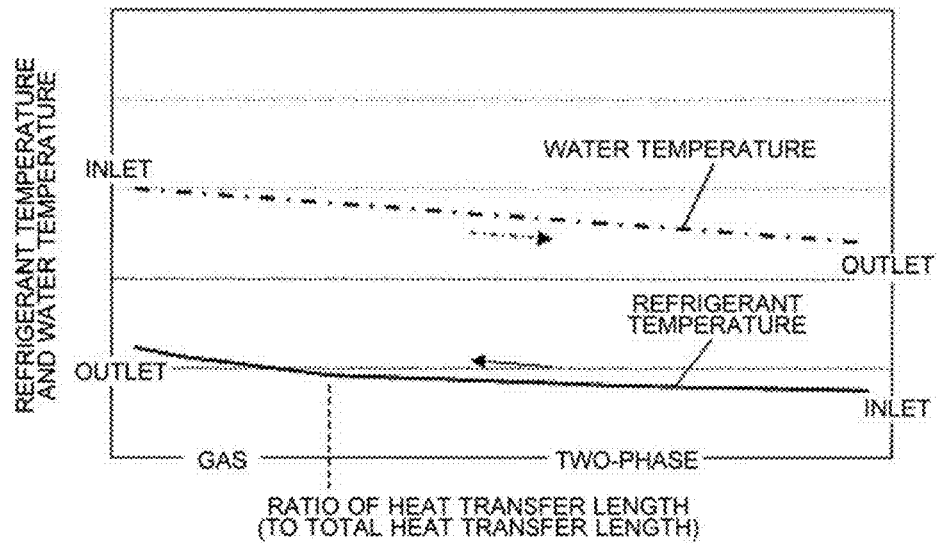
FIG. 12 is a diagram illustrating an example temperature distribution in a second relay heat exchanger during the cooling operation of the air-conditioning apparatus in Embodiment 2 of the present disclosure.

FIG. 12 is a diagram illustrating an example temperature distribution in the second relay heat exchanger during the cooling operation of the air-conditioning apparatus in Embodiment 2 of the present disclosure. In FIG. 12, the horizontal axis represents the ratio of the heat transfer length to the total heat transfer length. The vertical axis represents the refrigerant temperature and the water temperature. The refrigerant passing through the second relay heat exchanger 8b receives heat from water having a high temperature, and accordingly the state changes to two-phase refrigerant and gas refrigerant. The low-temperature and low-pressure two-phase refrigerant that has flowed into the second relay heat exchanger 8b increases in temperature as evaporation progresses, and becomes saturated gas refrigerant from the two-phase refrigerant. The saturated gas refrigerant increases in temperature, and becomes superheated gas refrigerant from the saturated gas refrigerant.

The temperature distribution in the refrigerant-refrigerant heat exchanger 14 during the cooling operation is similar to that in FIG. 5 described above with reference to Embodiment 1, and the description thereof is thus omitted.

<Control in Cooling Operation Mode>

Control for the first flow switching device 2, the second flow switching device 4, and the bypass expansion device 13 is similar to control in the cooling operation mode in Embodiment 1.

The controller 91 controls the first expansion device 5 based on the pressure detected by the low-pressure sensor 73 installed in the outdoor unit 101 and the temperature detected by the refrigerant outlet temperature sensor 76 installed in the relay unit 202. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the first expansion device 5 based on the temperature detected by the refrigerant outlet temperature sensor 76 and the relationship between the refrigerant temperature and the quality of the two-phase refrigerant or the degree of superheat of the gas refrigerant. It is desirable to control the first expansion device 5 to maintain, as control target values, a quality of 0.9 or more, at which excessive liquid return to the compressor 1 can be suppressed, and a degree of superheat of 3 K or less, at which the efficiency of the first relay heat exchanger 8a and the efficiency of the relay heat exchanger 8b can be maintained. Further, the controller 91 performs control to fully open the second expansion device 16 to reduce pressure loss between the first relay heat exchanger 8a and the second relay heat exchanger 8b.

<Heating Operation Mode>

Figure 13:
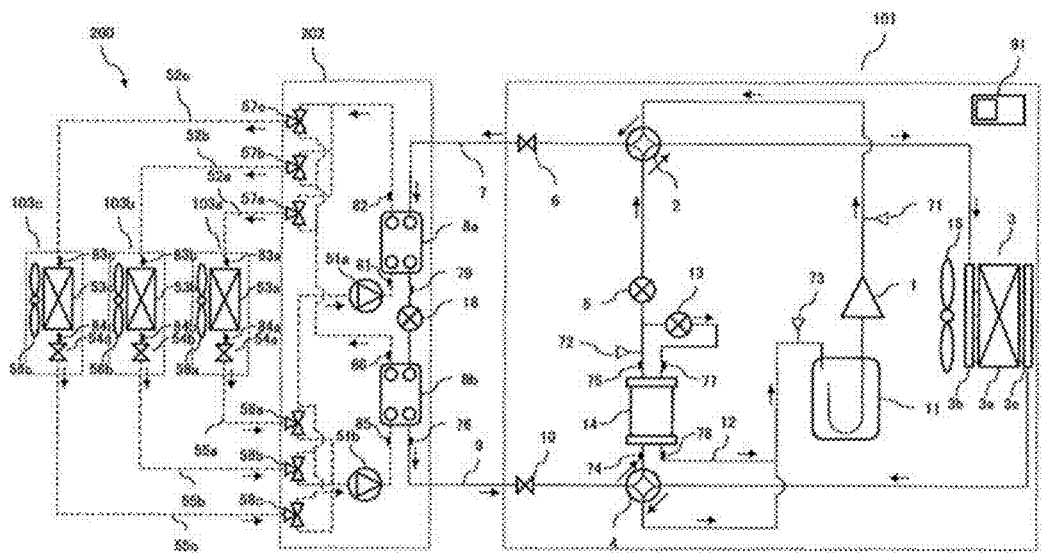
FIG. 13 is a diagram illustrating an example of a refrigerant flow and other flows during a heating operation of the air-conditioning apparatus in Embodiment 2 of the present disclosure.

FIG. 13 is a diagram illustrating an example of a refrigerant flow and other flows during a heating operation of the air-conditioning apparatus in Embodiment 2 of the present disclosure. The example illustrated in FIG. 13 describes a heating operation mode in which the indoor unit 103a to the indoor unit 103c perform heating. In FIG. 13, for easy understanding of Embodiment 2, the flow direction of the refrigerant is indicated by a solid-line arrow, and the flow direction of water is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the first relay heat exchanger 8a through the first flow switching device 2 and the primary-side outgoing pipe 7. The first relay heat exchanger 8a exchanges heat between the high-temperature and high-pressure gas refrigerant and water circulating in the secondary-side circuit by the first pump 51a. The high-temperature and high-pressure gas refrigerant is cooled by heat exchange in the first relay heat exchanger 8a into medium-temperature and high-pressure two-phase refrigerant or liquid refrigerant. The liquid refrigerant or medium-temperature and high-pressure two-phase refrigerant, which is cooled and condensed by the first relay heat exchanger 8a, flows into the second relay heat exchanger 8b through the second expansion device 16. The second relay heat exchanger 8b exchanges heat between water circulating in the secondary-side circuit, which is supplied from the second pump 51b, and the high-temperature and high-pressure two-phase refrigerant. The medium-temperature and high-pressure two-phase or liquid refrigerant condensed by the second relay heat exchanger 8b flows into the refrigerant-refrigerant heat exchanger 14 through the primary-side return pipe 9 and the second flow switching device 4. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant or liquid refrigerant flowing between the second flow switching device 4 and the first expansion device 5. The low-temperature and high-pressure liquid refrigerant cooled in the refrigerant-refrigerant heat exchanger 14 flows into the first expansion device 5. The first expansion device 5 reduces the pressure of the low-temperature and high-pressure liquid refrigerant. The low-temperature and low-pressure two-phase refrigerant, whose pressure has been reduced by the first expansion device 5, flows into the outdoor heat exchanger 3 through the first flow switching device 2. The outdoor heat exchanger 3 exchanges heat between the outdoor air supplied from the outdoor fan 15 and the low-temperature and low-pressure two-phase refrigerant. The low-temperature and low-pressure two-phase refrigerant or gas refrigerant heated by the outdoor heat exchanger 3 is again sucked into the compressor 1 through the second flow switching device 4 and the accumulator 11.

Part of the low-temperature and high-pressure liquid refrigerant, which branches into the bypass pipe 12, flows into the bypass expansion device 13. The bypass expansion device 13 reduces the pressure of the low-temperature and high-pressure liquid refrigerant. The low-temperature and low-pressure two-phase refrigerant, whose pressure has been reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant or liquid refrigerant flowing between the second flow switching device 4 and the first expansion device 5. The low-temperature and low-pressure two-phase refrigerant or gas refrigerant heated by the refrigerant-refrigerant heat exchanger 14 flows to the suction side of the compressor 1.

Next, the operation of the devices in the secondary-side circuit will be described with reference to the flow of water. The first pump 51a and the second pump 51b suck and deliver water. The medium-temperature water delivered by the first pump 51a and the medium-temperature water delivered by the second pump 51b flow into the first relay heat exchanger 8a and the second relay heat exchanger 8b, respectively. The first relay heat exchanger 8a and the second relay heat exchanger 8b exchange heat between the high-temperature and high-pressure gas or two-phase refrigerant circulating in the primary-side circuit and the medium-temperature water. The high-temperature water heated by the first relay heat exchanger 8a and the second relay heat exchanger 8b flows into the indoor heat exchanger 53a to the indoor heat exchanger 53*c* through the first flow switching valve 57*a* to the first flow switching valve 57*c* and the secondary-side outgoing pipe 52*a* to the secondary-side outgoing pipe 52*c*. The indoor heat exchanger 53*a* to the indoor heat exchanger 53*c* exchange heat between the indoor air supplied from the indoor fan 56*a* to the indoor fan 56*c* and the high-temperature water. The medium-temperature water cooled by the indoor heat exchanger 53*a* to the indoor heat exchanger 53*c* is again sucked into the first pump 51*a* and the second pump 51*b* through the flow control valve 54*a* to the flow control valve 54*c*, the secondary-side return pipe 55*a* to the secondary-side return pipe 55*c*, and the second flow switching valve 58*a* to the second flow switching valve 58*c*.

<Temperature Distribution in Heat Exchangers in Heating Operation Mode>

The temperature distribution in the outdoor heat exchanger 3 during the heating operation is similar to that in FIG. 8 described above with reference to Embodiment 1.

Figure 14:
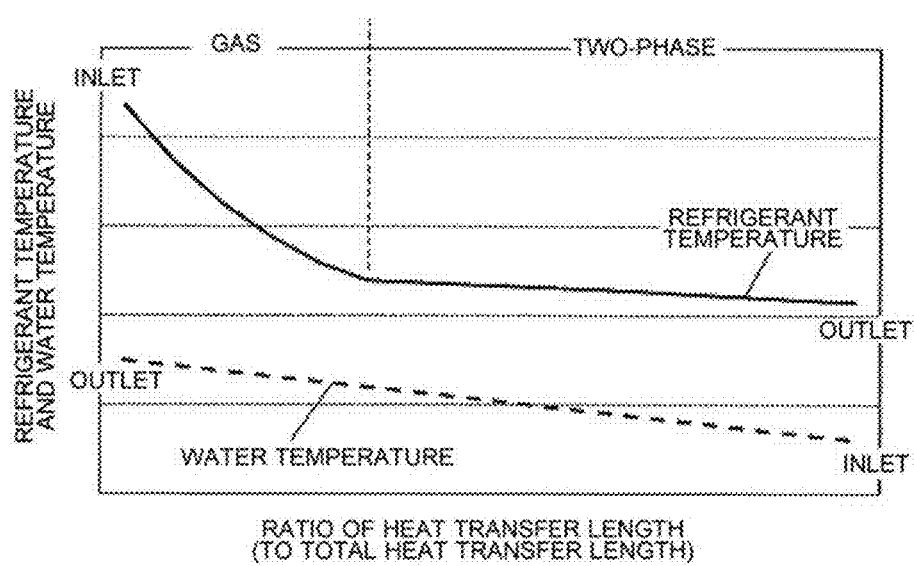
FIG. 14 is a diagram illustrating an example temperature distribution in the first relay heat exchanger during the heating operation of the air-conditioning apparatus in Embodiment 2 of the present disclosure.

FIG. 14 is a diagram illustrating an example temperature distribution in the first relay heat exchanger during the heating operation of the air-conditioning apparatus in Embodiment 2 of the present disclosure. In FIG. 14, the horizontal axis represents the ratio of the heat transfer length to the total heat transfer length. The vertical axis represents the refrigerant temperature and the air temperature. The refrigerant passing through the first relay heat exchanger 8*a* receives heat from water having a low temperature, and accordingly the quality of the two-phase refrigerant changes. The low-temperature and low-pressure two-phase refrigerant that has flowed into the first relay heat exchanger 8*a* increases in temperature as evaporation progresses. Transferring heat to water having a low temperature changes the gas refrigerant to two-phase refrigerant. The high-temperature and high-pressure gas refrigerant that has flowed into the first relay heat exchanger 8*a* decreases in temperature, and becomes saturated gas refrigerant from superheated gas refrigerant. The saturated gas refrigerant decreases in temperature as condensation progresses, and becomes two-phase refrigerant from the saturated gas refrigerant.

Figure 15:
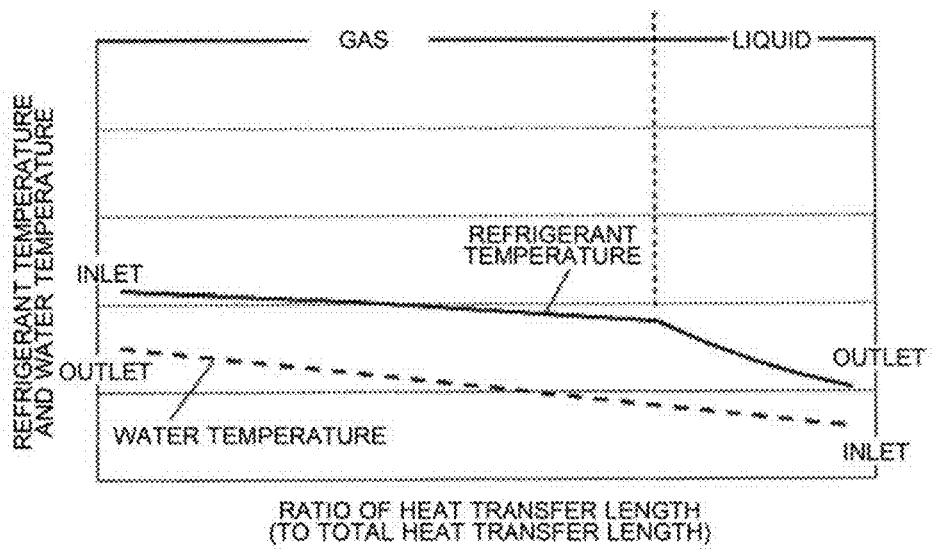
FIG. 15 is a diagram illustrating an example temperature distribution in the second relay heat exchanger during the heating operation of the air-conditioning apparatus in Embodiment 2 of the present disclosure.

FIG. 15 is a diagram illustrating an example temperature distribution in the second relay heat exchanger during the heating operation of the air-conditioning apparatus in Embodiment 2 of the present disclosure. In FIG. 15, the horizontal axis represents the ratio of the heat transfer length to the total heat transfer length. The vertical axis represents the refrigerant temperature and the water temperature. The refrigerant passing through the second relay heat exchanger 8*b* transfers heat to water having a low temperature, and accordingly the state changes from the two-phase refrigerant to liquid refrigerant. The medium-temperature and high-pressure two-phase refrigerant that has flowed into the second relay heat exchanger 8*b* decreases in temperature as condensation progresses, and becomes saturated liquid refrigerant from the two-phase refrigerant. The saturated liquid refrigerant decreases in temperature, and becomes subcooled liquid refrigerant from the saturated liquid refrigerant.

<Control in Heating Operation Mode>

Control for the first flow switching device 2, the second flow switching device 4, and the bypass expansion device 13 is similar to control in the heating operation mode in Embodiment 1.

The controller 91 controls the first expansion device 5 based on the pressure detected by the low-pressure sensor 73 installed in the outdoor unit 101 and the temperature detected by the refrigerant outlet temperature sensor 76 installed in the relay unit 202 or the first liquid temperature sensor 74 installed in the outdoor unit 101. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the first expansion device 5 based on the temperature detected by the refrigerant outlet temperature sensor 76 or the first liquid temperature sensor 74 installed in the outdoor unit 101 and the relationship between the refrigerant temperature and the quality of the two-phase refrigerant or the degree of superheat of the gas refrigerant. It is desirable to control the first expansion device 5 with, as control target values, a quality of 0.2 or less, at which the reduction in capacity due to the reduction in enthalpy difference can be suppressed and the increase in the amount of refrigerant in the primary-side return pipe 9 can be suppressed, and a degree of subcooling of 15 K or less, at which the efficiency of the relay heat exchanger 8*a* and the second relay heat exchanger 8*b* can be maintained.

Further, the controller 91 performs control to fully open the second expansion device 16 to reduce pressure loss between the first relay heat exchanger 8*a* and the second relay heat exchanger 8*b*.

<Cooling and Heating Simultaneous (Cooling Main) Operation Mode>

Figure 16:
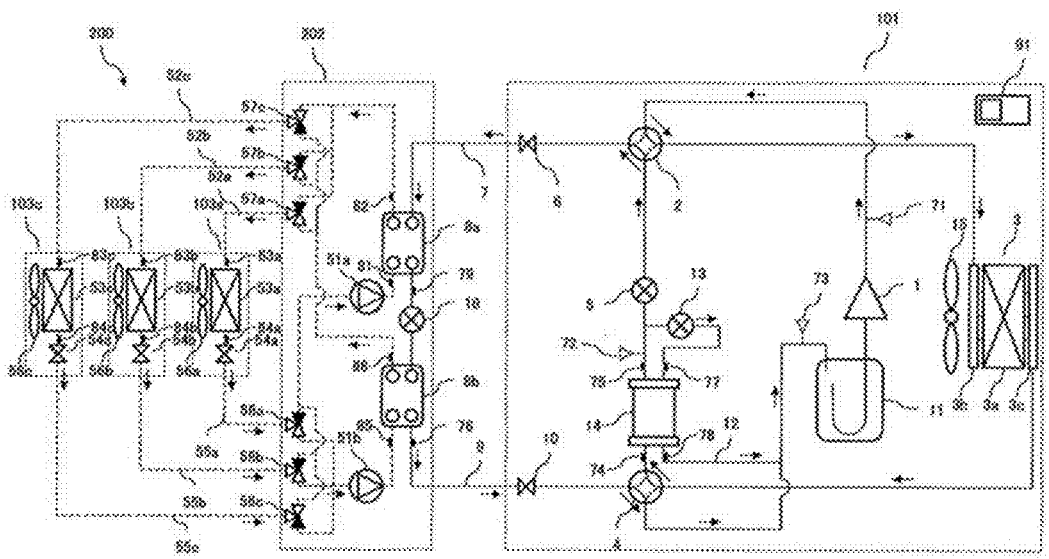
FIG. 16 is a diagram illustrating an example of a refrigerant flow and other flows during a cooling and heating simultaneous (cooling main) operation of the air-conditioning apparatus in Embodiment 2 of the present disclosure.

FIG. 16 is a diagram illustrating an example of a refrigerant flow and other flows during a cooling and heating simultaneous (cooling main) operation of the air-conditioning apparatus in Embodiment 2 of the present disclosure. The example illustrated in FIG. 16 describes a cooling and heating simultaneous (cooling main) operation mode in which the indoor unit 103*a* and the indoor unit 103*b* perform cooling and the indoor unit 103*c* performs heating. In FIG. 16, for easy understanding of Embodiment 2, the flow direction of the refrigerant is indicated by a solid-line arrow, and the flow direction of water is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the outdoor heat exchanger 3 through the first flow switching device 2. The outdoor heat exchanger 3 exchanges heat between the outdoor air supplied from the outdoor fan 15 and the high-temperature and high-pressure gas refrigerant. The medium-temperature and high-pressure two-phase refrigerant condensed by the outdoor heat exchanger 3 flows into the first relay heat exchanger 8*a* through the second flow switching device 4, the refrigerant-refrigerant heat exchanger 14, the first expansion device 5, the first flow switching device 2, and the primary-side outgoing pipe 7. The first relay heat exchanger 8*a* exchanges heat between water circulating in the secondary-side circuit, which is supplied from the first pump 51*a*, and the medium-temperature and high-pressure two-phase refrigerant. The low-temperature and high-pressure two-phase refrigerant condensed by the first relay heat exchanger 8*a* flows into the second expansion device 16. The second expansion device 16 reduces the pressure of the low-temperature and high-pressure liquid refrigerant. The low-temperature and low-pressure two-phase refrigerant, whose pressure has been reduced by the second expansion device 16, flows into the second relay heat exchanger 8b. The second relay heat exchanger 8b exchanges heat between water circulating in the secondary-side circuit, which is supplied from the second pump 51b, and the low-temperature and low-pressure two-phase refrigerant. The low-temperature and low-pressure two-phase or gas refrigerant evaporated by the second relay heat exchanger 8b is again sucked into the compressor 1 through the primary-side return pipe 9, the second flow switching device 4, and the accumulator 11.

Part of the medium-temperature and high-pressure two-phase refrigerant, which branches into the bypass pipe 12, flows into the bypass expansion device 13. The bypass expansion device 13 reduces the pressure of the medium-temperature and high-pressure two-phase refrigerant. The low-temperature and low-pressure two-phase refrigerant, whose pressure has been reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the medium-temperature and high-pressure two-phase refrigerant flowing between the second flow switching device 4 and the first expansion device 5. The low-temperature and low-pressure two-phase or gas refrigerant heated by the refrigerant-refrigerant heat exchanger 14 flows into the suction portion of the compressor 1.

Next, the operation of the devices in the secondary-side circuit will be described with reference to the flow of water. The first pump 51a sucks and delivers medium-temperature water. The medium-temperature water delivered by the first pump 51a flows into the first relay heat exchanger 8a. The first relay heat exchanger 8a exchanges heat between the medium-temperature and high-pressure two-phase refrigerant circulating in the primary-side circuit and the medium-temperature water. The high-temperature water heated by the first relay heat exchanger 8a flows into the indoor heat exchanger 53c through the first flow switching valve 57c and the secondary-side outgoing pipe 52c. The indoor heat exchanger 53c exchanges heat between the indoor air supplied from the indoor fan 56c and the high-temperature water. The medium-temperature water cooled by the indoor heat exchanger 53c is again sucked into the first pump 51a through the flow control valve 54c, the secondary-side return pipe 55c, and the second flow switching valve 58c.

The second pump 51b sucks water, increases the pressure of the water, and delivers medium-temperature water. The medium-temperature water delivered by the second pump 51b flows into the second relay heat exchanger 8b. The second relay heat exchanger 8b exchanges heat between the low-temperature and low-pressure two-phase refrigerant circulating in the primary-side circuit and the medium-temperature water. The low-temperature water cooled by the second relay heat exchanger 8b flows into the indoor heat exchanger 53a and the indoor heat exchanger 53b through the first flow switching valve 57a and the first flow switching valve 57b, and the secondary-side outgoing pipe 52a and the secondary-side outgoing pipe 52b, respectively. The indoor heat exchanger 53a and the indoor heat exchanger 53b exchange heat between the indoor air supplied from the indoor fan 56a and the indoor fan 56b and the low-temperature water. The medium-temperature water heated by the indoor heat exchanger 53a and the indoor heat exchanger 53b is again sucked into the second pump 51b through the flow control valve 54a and the flow control valve 54b, the secondary-side return pipe 55a and the secondary-side return pipe 55b, and the second flow switching valve 58a and the second flow switching valve 58b, respectively.

<Temperature Distribution in Heat Exchangers in Cooling and Heating Simultaneous (Cooling Main) Operation Mode>

Figure 17:
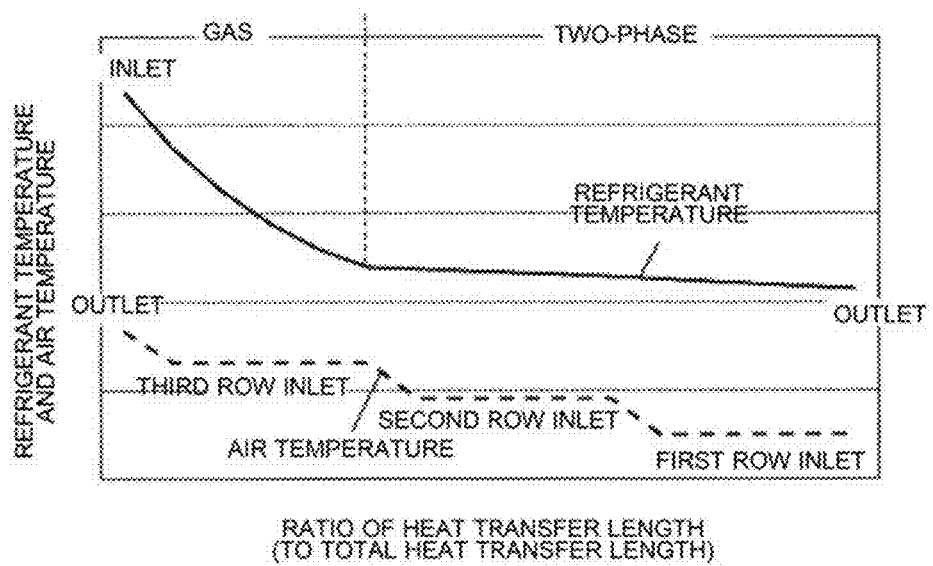
FIG. 17 is a diagram illustrating an example temperature distribution in an outdoor heat exchanger 3 during the cooling and heating simultaneous (cooling main) operation of the air-conditioning apparatus in Embodiment 2 of the present disclosure.

FIG. 17 is a diagram illustrating an example temperature distribution in the outdoor heat exchanger 3 during the cooling and heating simultaneous (cooling main) operation of the air-conditioning apparatus in Embodiment 2 of the present disclosure. In FIG. 17, the horizontal axis represents the ratio of the heat transfer length to the total heat transfer length. The vertical axis represents the refrigerant temperature and the air temperature. The refrigerant passing through the outdoor heat exchanger 3 transfers heat to air having a low temperature, and accordingly the state changes from gas refrigerant to two-phase refrigerant. The high-temperature and high-pressure gas refrigerant that has flowed into the outdoor heat exchanger 3 decreases in temperature, and becomes saturated gas refrigerant from superheated gas refrigerant. The saturated gas refrigerant decreases in temperature as condensation progresses, and becomes two-phase refrigerant.

The temperature distribution in the first relay heat exchanger 8a in the cooling and heating simultaneous (cooling main) operation mode is similar to that in FIG. 15. The temperature distribution in the second relay heat exchanger 8b in the cooling and heating simultaneous (cooling main) operation mode is similar to that in FIG. 4.

<Control in Cooling and Heating Simultaneous (Cooling Main) Operation Mode>

In response to a request for a cooling operation and a heating operation from any one of the indoor units 103a to 103c, the cooling and heating simultaneous (cooling main) operation is performed when the cooling load is larger than the heating load. The controller 91 switches the flow path of the first flow switching device 2 so that the discharge side of the compressor 1 and the outdoor heat exchanger 3 communicate and the first expansion device 5 and the primary-side outgoing pipe 7 communicate. Further, the controller 91 switches the flow path of the second flow switching device 4 so that the suction side of the compressor 1 and the primary-side return pipe 9 communicate and the outdoor heat exchanger 3 and the first expansion device 5 communicate. Then, the controller 91 performs control to fully open the first expansion device 5 to reduce pressure loss between the outdoor heat exchanger 3 and the first relay heat exchanger 8a.

The controller 91 controls the second expansion device 16 based on the pressure detected by the low-pressure sensor 73 installed in the outdoor unit 101 and the temperature detected by the refrigerant outlet temperature sensor 76 installed in the relay unit 202. The controller 91 calculates the relationship between the refrigerant temperature and the quality of the two-phase refrigerant or the degree of superheat of the gas refrigerant, based on the pressure detected by the low-pressure sensor 73. In a case where the refrigerant is a non-azeotropic refrigerant mixture, the temperature increases as evaporation progresses. Thus, the temperature is measured to determine the quality of the two-phase refrigerant. The controller 91 controls the second expansion device 16 based on the temperature detected by the refrigerant outlet temperature sensor 76 and the relationship between the refrigerant temperature and the quality of the two-phase refrigerant or the degree of superheat of the gas refrigerant. It is desirable to control the second expansion device 16 to maintain, as control target values, a quality of 0.9 or more, at which excessive liquid return to the compressor 1 can be suppressed, and a degree of superheat of 3 K or less, at which the efficiency of the first relay heat exchanger 8a and the second relay heat exchanger 8b can be maintained. On the other hand, the controller 91 performs control to fully close the bypass expansion device 13 to allow the outdoor heat exchanger 3 and the first relay heat exchanger 8a to act as condensers.

The controller 91 senses the refrigerant composition to calculate the relationship between the refrigerant temperature and the quality of the two-phase refrigerant or the degree of superheat of the gas refrigerant. The controller 91 calculates the enthalpy of the medium-temperature and high-pressure high-pressure two-phase refrigerant that has passed through the refrigerant-refrigerant heat exchanger 14, based on the pressure detected by the second high-pressure sensor 72 and the temperature detected by the second liquid temperature sensor 75. The controller 91 further calculates the enthalpy of the low-temperature and low-pressure low-pressure two-phase refrigerant that has passed through the bypass expansion device 13, based on the pressure detected by the low-pressure sensor 73 and the temperature detected by the two-phase temperature sensor 77. If the refrigerant circulates with the assumed refrigerant composition, the calculated high-pressure two-phase refrigerant enthalpy and low-pressure two-phase refrigerant enthalpy are equal. If the refrigerant circulates with a composition different from the assumed refrigerant composition, the calculated high-pressure two-phase refrigerant enthalpy and low-pressure two-phase refrigerant enthalpy are not equal. In this case, the assumed refrigerant composition is reviewed so that the high-pressure two-phase refrigerant enthalpy and the low-pressure two-phase refrigerant enthalpy become equal. Accordingly, the circulating refrigerant composition can be sensed.

<Cooling and Heating Simultaneous (Heating Main) Operation Mode>

Figure 18:
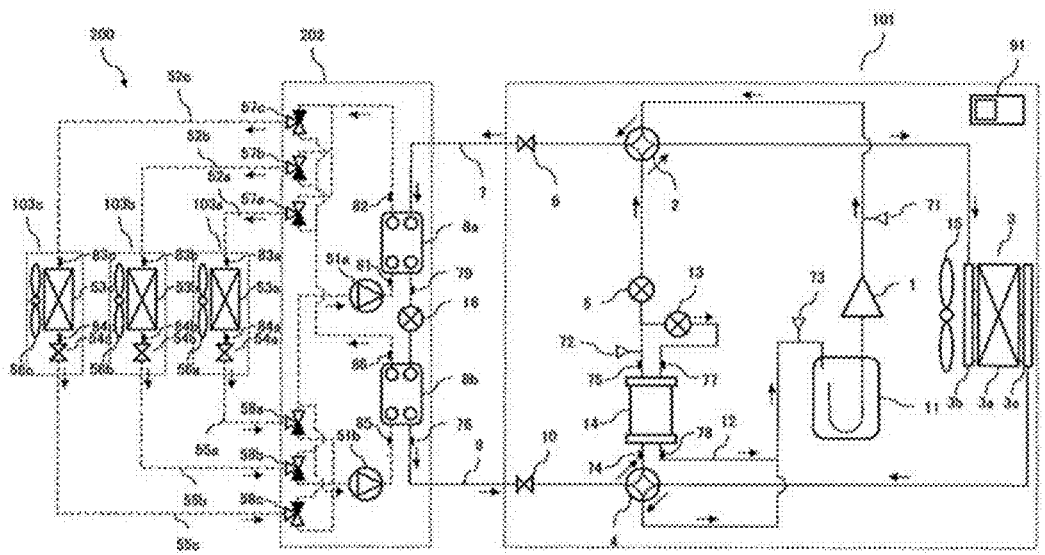
FIG. 18 is a diagram illustrating an example of a refrigerant flow and other flows during a cooling and heating simultaneous (heating main) operation of the air-conditioning apparatus in Embodiment 2 of the present disclosure.

FIG. 18 is a diagram illustrating an example of a refrigerant flow and other flows during a cooling and heating simultaneous (heating main) operation of the air-conditioning apparatus in Embodiment 2 of the present disclosure. The example illustrated in FIG. 18 describes a cooling and heating simultaneous (heating main) operation mode in which the indoor unit 103a and the indoor unit 103b perform heating and the indoor unit 103c perform cooling. In FIG. 18, for easy understanding of Embodiment 2, the flow direction of the refrigerant is indicated by a solid-line arrow, and the flow direction of water is indicated by a broken-line arrow.

First, the operation of the devices in the primary-side circuit will be described with reference to the flow of the refrigerant. The compressor 1 sucks and compresses low-temperature and low-pressure gas refrigerant, and discharges high-temperature and high-pressure gas refrigerant. The high-temperature and high-pressure gas refrigerant discharged from the compressor 1 flows into the first relay heat exchanger 8a through the first flow switching device 2 and the primary-side outgoing pipe 7. The first relay heat exchanger 8a exchanges heat between water circulating in the secondary-side circuit, which is supplied from the first pump 51a, and the high-temperature and high-pressure gas refrigerant. The low-temperature and high-pressure two-phase or liquid refrigerant condensed by the first relay heat exchanger 8a flows into the second expansion device 16. The second expansion device 16 reduces the pressure of the low-temperature and high-pressure liquid refrigerant. The low-temperature and low-pressure two-phase refrigerant, whose pressure has been reduced by the second expansion device 16, flows into the second relay heat exchanger 8b. The second relay heat exchanger 8b exchanges heat between water circulating in the secondary-side circuit, which is supplied from the second pump 51b, and the low-temperature and low-pressure two-phase refrigerant. The low-temperature and low-pressure two-phase refrigerant evaporated by the second relay heat exchanger 8b flows into the outdoor heat exchanger 3 through the primary-side return pipe 9, the second flow switching device 4, the refrigerant-refrigerant heat exchanger 14, the first expansion device 5, and the first flow switching device 2. The outdoor heat exchanger 3 exchanges heat between the outdoor air supplied from the outdoor fan 15 and the low-temperature and low-pressure two-phase refrigerant. The low-temperature and high-pressure two-phase or gas refrigerant evaporated by the outdoor heat exchanger 3 is again sucked into the compressor 1 through the second flow switching device 4 and the accumulator 11.

Part of the low-temperature and low-pressure two-phase refrigerant, which branches into the bypass pipe 12, flows into the bypass expansion device 13. The bypass expansion device 13 reduces the pressure of the low-temperature and low-pressure two-phase refrigerant. The low-temperature and low-pressure two-phase refrigerant, whose pressure is reduced by the bypass expansion device 13, flows into the refrigerant-refrigerant heat exchanger 14. The refrigerant-refrigerant heat exchanger 14 exchanges heat between the low-temperature and low-pressure two-phase refrigerant flowing through the bypass having the bypass pipe 12 and the low-temperature and low-pressure two-phase refrigerant flowing between the second flow switching device 4 and the first expansion device 5. The low-temperature and low-pressure two-phase or gas refrigerant heated by the refrigerant-refrigerant heat exchanger 14 flows into the suction portion of the compressor 1.

Next, the operation of the devices in the secondary-side circuit will be described with reference to the flow of water. The first pump 51a sucks and delivers medium-temperature water. The medium-temperature water delivered by the first pump 51a flows into the first relay heat exchanger 8a. The first relay heat exchanger 8a exchanges heat between the high-temperature and high-pressure gas refrigerant circulating in the primary-side circuit and the medium-temperature water. The high-temperature water heated by the first relay heat exchanger 8a flows into the indoor heat exchanger 53a and the indoor heat exchanger 53b through the first flow switching valve 57a and the first flow switching valve 57b, and the secondary-side outgoing pipe 52a and the secondary-side outgoing pipe 52b, respectively. The indoor heat exchanger 53a and the indoor heat exchanger 53b exchange heat between the indoor air supplied from the indoor fan 56a and the indoor fan 56b and the high-temperature water. The medium-temperature water cooled by the indoor heat exchanger 53a and the indoor heat exchanger 53b is again sucked into the first pump 51a through the flow control valve 54a and the flow control valve 54b, the secondary-side return pipe 55a, and the secondary-side return pipe 55b, and the second flow switching valve 58a and the second flow switching valve 58b, respectively.

The second pump 51b sucks water, increases the pressure of the water, and delivers medium-temperature water. The medium-temperature water delivered by the second pump 51b flows into the second relay heat exchanger 8b. The second relay heat exchanger 8b exchanges heat between the low-temperature and low-pressure two-phase refrigerant circulating in the primary-side circuit and the medium-temperature water. The low-temperature water cooled by the second relay heat exchanger 8*b* flows into the indoor heat exchanger 53*c* through the first flow switching valve 57*c* and the secondary-side outgoing pipe 52*c*. The indoor heat exchanger 53*c* exchanges heat between the indoor air supplied from the indoor fan 56*c* and the low-temperature water. The medium-temperature water heated by the indoor heat exchanger 53*c* is again sucked into the second pump 51*b* through the flow control valve 54*c*, the secondary-side return pipe 55*c*, and the second flow switching valve 58*c*.

<Temperature Distribution in Heat Exchangers in Cooling and Heating Simultaneous (Heating Main) Operation Mode>

The temperature distribution in the outdoor heat exchanger 3 in the cooling and heating simultaneous (heating main) operation mode is similar to that in FIG. 8 described above with reference to Embodiment 1. The temperature distribution in the first relay heat exchanger 8*a* in the cooling and heating simultaneous (heating main) operation mode is similar to that in FIG. 7 described above with reference to Embodiment 1. The temperature distribution in the second relay heat exchanger 8*b* in the cooling and heating simultaneous (heating main) operation mode is similar to that in FIG. 11 described above with reference to the temperature distribution in the heat exchangers during the cooling operation.

<Control in Cooling and Heating Simultaneous (Heating Main) Operation Mode>

In response to a request for a cooling operation and a heating operation from any one of the indoor units 103*a* to 103*c*, the cooling and heating simultaneous (heating main) operation is performed when the heating load is larger than the cooling load. The controller 91 switches the first flow switching device 2 so that the discharge side of the compressor 1 and the primary-side outgoing pipe 7 communicate and the outdoor heat exchanger 3 and the first expansion device 5 communicate. Further, the controller 91 switches the second flow switching device 4 so that the suction side of the compressor 1 and the outdoor heat exchanger 3 communicate and the first expansion device 5 and the primary-side return pipe 9 communicate. Then, the controller 91 performs control to fully open the first expansion device 5 to reduce pressure loss between the outdoor heat exchanger 3 and the first relay heat exchanger 8*a*.

The controller 91 controls the second expansion device 16 based on the pressure detected by the first high-pressure sensor 71 installed in the outdoor unit 101 and the temperature detected by the refrigerant intermediate temperature sensor 79 installed in the relay unit 202. The controller 91 calculates the relationship between the refrigerant temperature and the quality of the two-phase refrigerant or the degree of subcooling of the liquid refrigerant, based on the pressure detected by the first high-pressure sensor 71. In a case where the refrigerant is a non-azeotropic refrigerant mixture, the temperature decreases as condensation progresses. Thus, the temperature is measured to determine the quality of the two-phase refrigerant. The controller 91 controls the second expansion device 16 based on the temperature detected by the refrigerant intermediate temperature sensor 79 and the relationship between the refrigerant temperature and the quality of the two-phase refrigerant or the degree of subcooling of the liquid refrigerant. It is desirable to control the second expansion device 16 at, as control target values, a quality of 0.01 or less or a degree of subcooling of 15 K or less such that refrigerant sound generated in the second expansion device 16 can be suppressed. On the other hand, the controller 91 performs control to fully close the bypass expansion device 13 to allow the outdoor heat exchanger 3 and the first relay heat exchanger 8*a* to act as condensers.

The controller 91 senses the refrigerant composition to calculate the relationship between the refrigerant temperature and the quality of the two-phase refrigerant or the degree of subcooling of the liquid refrigerant. The controller 91 calculates the enthalpy of the low-temperature and low-pressure mainstream two-phase refrigerant that has passed through the refrigerant-refrigerant heat exchanger 14, based on the pressure detected by the second high-pressure sensor 72 and the temperature detected by the second liquid temperature sensor 75. The controller 91 further calculates the enthalpy of the low-temperature and low-pressure branched two-phase refrigerant that has passed through the bypass expansion device 13, based on the pressure detected by the low-pressure sensor 73 and the temperature detected by the two-phase temperature sensor 77. If the refrigerant circulates with the assumed refrigerant composition, the calculated mainstream two-phase refrigerant enthalpy and branched two-phase refrigerant enthalpy are equal. If the refrigerant circulates with a composition different from the assumed refrigerant composition, the calculated mainstream two-phase refrigerant enthalpy and branched two-phase refrigerant enthalpy are not equal. In this case, the assumed refrigerant composition is reviewed so that the mainstream two-phase refrigerant enthalpy and the branched two-phase refrigerant enthalpy become equal. Accordingly, the circulating refrigerant composition can be sensed.

<Effect of Air-Conditioning Apparatus Capable of Cooling and Heating Simultaneous Operation>

As described above, the air-conditioning apparatus 200 of Embodiment 2 includes the first flow switching device 2 and the second flow switching device 4. The controller 91 switches the flow path among the cooling operation, the heating operation, and the cooling and heating simultaneous operation using the first flow switching device 2 and the second flow switching device 4. Thus, in all of the cooling operation, the heating operation, and the cooling and heating simultaneous operation, air, water, and refrigerant, which are target media to be subjected to heat exchange with the refrigerant in the respective heat exchangers, namely, the outdoor heat exchanger 3, the first relay heat exchanger 8*a* and the second relay heat exchanger 8*b*, and the refrigerant-refrigerant heat exchanger 14, can be made to flow in a counter flow direction in which the refrigerant flow direction is opposite to the direction of the flow of the target media. This avoids an approach between the temperatures of the target media and the temperature of the refrigerant and ensures a temperature difference required for heat exchange, thereby making it possible to improve heat exchange efficiency.

Furthermore, in the refrigerant-refrigerant heat exchanger 14, in both the cooling operation and the heating operation, heat is exchanged between the medium-temperature and high-pressure two-phase or liquid refrigerant flowing between the second flow switching device 4 and the first expansion device 5 and the low-temperature and low-pressure two-phase refrigerant flowing through the bypass having the bypass pipe 12. It is therefore possible to decrease the pressure loss of the refrigerant flowing from the first flow switching device 2 to the second flow switching device 4 during the cooling operation and to decrease the pressure loss of the refrigerant flowing from the first flow switching device 2 to the second flow switching device 4 during the heating operation.

In addition, during the cooling operation, the first expansion device 5 is operated such that both the first relay heat exchanger 8a and the second relay heat exchanger 8b installed in the relay unit 202 act as evaporators. During the heating operation, the first expansion device 5 is operated such that both the first relay heat exchanger 8a and the second relay heat exchanger 8b act as condensers. During the cooling and heating simultaneous operation, the second expansion device 16 is operated such that the first relay heat exchanger 8a acts as a condenser and the second relay heat exchanger 8b act as an evaporator. Accordingly, the outdoor unit 101 and the indoor unit 103a to the indoor unit 103c can be shared with the air-conditioning apparatus 100 presented in Embodiment 1, and cost can be reduced.

In addition, the first relay heat exchanger 8a and the second relay heat exchanger 8b installed in the relay unit 202 exchange heat between the refrigerant flowing through the primary-side circuit and the water flowing through the secondary-side circuit. Then, the water subjected to heat exchange is supplied to the indoor unit 103a to the indoor unit 103c installed in the secondary-side circuit. This can make the refrigerant flow direction constant in both the cooling operation and the heating operation. This allows the plurality of indoor units 103 to individually operate or stop operating while maintaining the performance in the secondary-side circuit, and can implement a multi-chamber cooling/heating switching operation in which an operating indoor unit 103 operates in either cooling or heating mode.

Embodiment 3

Figure 19:
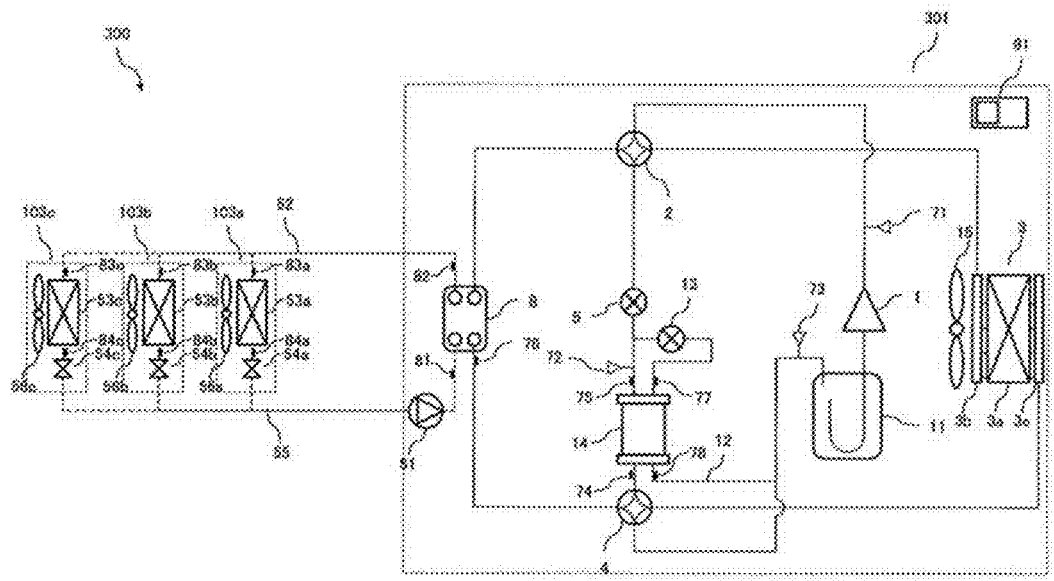
FIG. 19 is a diagram schematically illustrating an example configuration of circuits and other devices in an air-conditioning apparatus according to Embodiment 3 of the present disclosure.

FIG. 19 is a diagram schematically illustrating an example configuration of circuits and other devices in an air-conditioning apparatus according to Embodiment 3 of the present disclosure. In an air-conditioning apparatus 300 in FIG. 19, devices and other equipment that perform operations and the like similar to those of the devices and other equipment of the air-conditioning apparatus 100 described above in Embodiment 1 are denoted by the same numerals. The air-conditioning apparatus 300 in Embodiment 3 illustrated in FIG. 19 is different from the air-conditioning apparatus 100 of Embodiment 1 illustrated in FIG. 1 in the configuration of an outdoor unit 301. In addition, the relay unit 102 present in the air-conditioning apparatus 100 of Embodiment 1 is omitted. The air-conditioning apparatus 300 in Embodiment 3 is an air-conditioning apparatus capable of a cooling/heating switching operation in which each of the indoor units 103 individually operates or stops operating and an operating indoor unit 103 operates in either cooling or heating mode.
<Outdoor Unit 301>

The outdoor unit 301 of the air-conditioning apparatus 300 includes the relay heat exchanger 8, the pump 51, the refrigerant outlet temperature sensor 76, the first water temperature sensor 81, and the second water temperature sensor 82, which are mounted in the relay unit 102 of Embodiment 1. Thus, the relay unit 102 is not installed in the air-conditioning apparatus 300. While FIG. 19 illustrates an example in which the pump 51 is installed in the outdoor unit 301, this is not limiting. The pump 51 may be installed separately from the outdoor unit 301.
<Effects>

As described above, according to the air-conditioning apparatus 300 of Embodiment 3, since the outdoor unit 301 includes the relay heat exchanger 8 and the pump 51, the relay unit 102 does not need to be installed. Thus, even if there is no place to install the relay unit 102 in an indoor space, the air-conditioning apparatus 300 can be installed. Since there is no need to install the relay unit 102, the cost of the air-conditioning apparatus 300 can be reduced. Furthermore, since heat can be transported from the outdoor unit 301 to the indoor unit 103a to 103c by water, the amount of refrigerant can be reduced.

Embodiment 4

Figure 20:
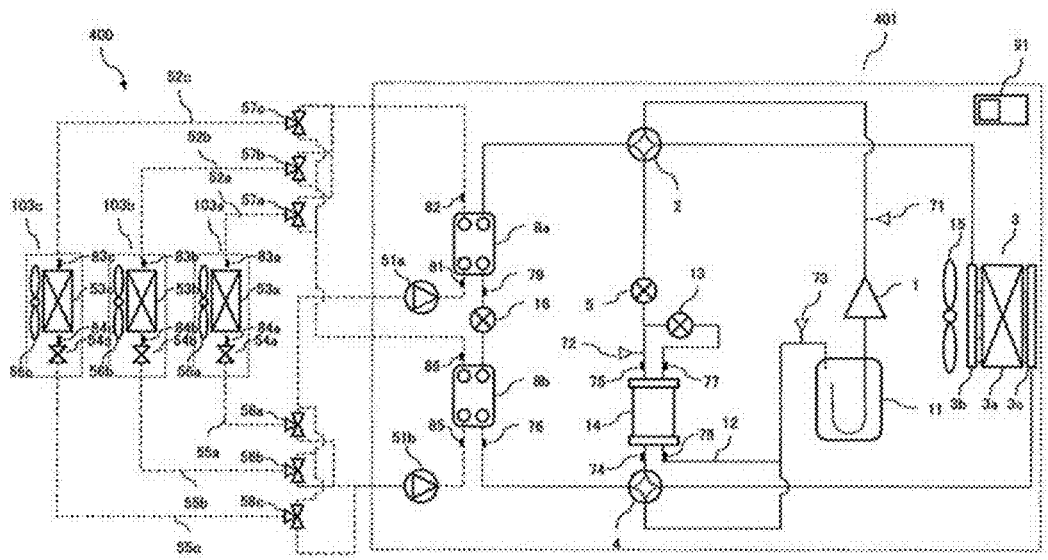
FIG. 20 is a diagram schematically illustrating an example configuration of circuits and other devices in an air-conditioning apparatus according to Embodiment 4 of the present disclosure.

FIG. 20 is a diagram schematically illustrating an example configuration of circuits and other devices in an air-conditioning apparatus according to Embodiment 4 of the present disclosure. In an air-conditioning apparatus 400 in FIG. 20, devices and other equipment that perform operations and the like similar to those of the devices and other equipment of the air-conditioning apparatus 200 described above in Embodiment 2 are denoted by the same numerals. The air-conditioning apparatus 400 in Embodiment 4 illustrated in FIG. 20 is different from the air-conditioning apparatus 200 of Embodiment 2 illustrated in FIG. 9 in the configuration of an outdoor unit 401. In addition, the relay unit 202 present in the air-conditioning apparatus 200 of Embodiment 2 is omitted. The air-conditioning apparatus 400 of Embodiment 4 is an air-conditioning apparatus capable of a cooling and heating simultaneous operation in which each of the indoor units 103 individually operates or stops operating and an operating indoor unit 103 selects cooling or heating.
<Outdoor Unit 401>

The outdoor unit 401 of the air-conditioning apparatus 400 includes the first relay heat exchanger 8a, the second relay heat exchanger 8b, the first pump 51a, and the second pump 51b, which are mounted in the relay unit 202 of Embodiment 2. The outdoor unit 401 further includes the refrigerant outlet temperature sensor 76, the refrigerant intermediate temperature sensor 79, the first water temperature sensor 81, the second water temperature sensor 82, the third water temperature sensor 85, the fourth water temperature sensor 86, and the first water temperature sensor 81, which are mounted in the relay unit 202 of Embodiment 2. While FIG. 20 illustrates an example in which the first pump 51a and the second pump 51b are mounted in the outdoor unit 401, this is not limiting. The first pump 51a and the second pump 51b may be installed separately from the outdoor unit 401.
<Effects>

As described above, according to the air-conditioning apparatus 400 of Embodiment 4, since the outdoor unit 401 includes the first relay heat exchanger 8a, the second relay heat exchanger 8b, the first pump 51a, and the second pump 51b, the relay unit 202 does not need to be installed. Thus, even if there is no place to install the relay unit 202 in an indoor space, the air-conditioning apparatus 400 can be installed. Since there is no need to install the relay unit 202, the cost of the air-conditioning apparatus 400 can be reduced. Furthermore, since heat can be transported from the outdoor unit 401 to the indoor unit 103a to the indoor unit 103c by water, the amount of refrigerant can be reduced.

REFERENCE SIGNS LIST

1: compressor, 2: first flow switching device, 3: outdoor heat exchanger, 3a: heat exchanger core, 3b: inlet-side distributor, 3c: outlet-side distributor, 4: second flow switching device, 5: first expansion device, 6, 10: opening and closing device, 7: primary-side outgoing pipe, 8: relay heat exchanger, 8a: first relay heat exchanger, 8b: second relay heat exchanger, 9: primary-side return pipe, 11: accumulator, 12: bypass pipe, 13: bypass expansion device, 14: refrigerant-refrigerant heat exchanger, 15: outdoor fan, 16: second expansion device, 51: pump, 51*a*: first pump, 51*b*: second pump, 52, 52*a*, 52*b*, 52*c*: secondary-side outgoing pipe, 53, 53*a*, 53*b*, 53*c*: indoor heat exchanger, 54, 54*a*, 54*b*, 54*c*: flow control valve, 55, 55*a*, 55*b*, 55*c*: secondary-side return pipe, 56, 56*a*, 56*b*, 56*c*: indoor fan, 57, 57*a*, 57*b*, 57*c*: first flow switching valve, 58, 58*a*, 58*b*, 58*c*: second flow switching valve, 71: first high-pressure sensor, 72: second high-pressure sensor, 73: low-pressure sensor, 74: first liquid temperature sensor, 75: second liquid temperature sensor, 76: refrigerant outlet temperature sensor, 77: two-phase temperature sensor, 78: gas temperature sensor, 79: refrigerant intermediate temperature sensor, 81: first water temperature sensor, 82: second water temperature sensor, 83, 83*a*, 83*b*, 83*c*: indoor inlet water temperature sensor, 84, 84*a*, 84*b*, 84*c*: indoor outlet water temperature sensor, 85: third water temperature sensor, 86: fourth water temperature sensor, 91: controller, 100, 200, 300, 400: air-conditioning apparatus, 101, 301, 401: outdoor unit, 102, 202: relay unit, 103, 103*a*, 103*b*, 103*c*: indoor unit.

The invention claimed is:

1. An air-conditioning apparatus comprising:
    a primary-side circuit in which a compressor that compresses refrigerant, a first flow switching device that switches a circulation path of the refrigerant, an outdoor heat exchanger that exchanges heat between the refrigerant and a heat-source-side fluid, a second flow switching device that switches the circulation path of the refrigerant, a first expansion device that is disposed at a pipe between the first flow switching device and the second flow switching device and adjusts a pressure of the refrigerant, and a relay heat exchanger that exchanges heat between the refrigerant and a heat medium different from the refrigerant are connected by pipes and in which the refrigerant circulates;
    a secondary-side circuit in which the relay heat exchanger, a pump that pressurizes the heat medium, a plurality of indoor heat exchangers, each of which exchanges heat between the heat medium and air for an air-conditioning target space, and heat medium flow control devices, each of which is installed in such a manner as to correspond to an indoor heat exchanger among the indoor heat exchangers and adjusts a flow rate of the heat medium passing through the indoor heat exchanger, are connected by pipes and in which the heat medium circulates;
    a refrigerant-refrigerant heat exchanger disposed at a pipe connecting the second flow switching device and the first expansion device to each other; and
    a bypass circuit including a bypass pipe having an end connected to a pipe between the refrigerant-refrigerant heat exchanger and the first expansion device, and another end connected to a pipe between the second flow switching device and the compressor, and a bypass expansion device that adjusts an amount of refrigerant passing through the bypass pipe;
    a controller configured to control the first flow switching device and the second flow switching device to provide the circulation path such that in a cooling operation and a heating operation, the refrigerant and the heat-source-side fluid flow through the outdoor heat exchanger in opposite directions and the refrigerant flows through the relay heat exchanger in a constant direction,
    wherein the pump is installed such that the heat medium flows through the relay heat exchanger in a direction opposite to the direction in which the refrigerant flows, and
    the refrigerant-refrigerant heat exchanger
    is disposed such that
        the refrigerant passing through the refrigerant-refrigerant heat exchanger and flowing between the second flow switching device and the first expansion device and
        the refrigerant passing through the refrigerant-refrigerant heat exchanger and flowing through the bypass circuit
        flow in opposite directions, and
    exchanges, in the refrigerant-refrigerant heat exchanger, heat between
        high-pressure two-phase refrigerant or liquid refrigerant flowing between the second flow switching device and the first expansion device and
        low-pressure two-phase refrigerant flowing through the bypass circuit having the bypass pipe
    in any of cooling and the heating operations.

2. The air-conditioning apparatus of claim 1
    wherein devices included in the primary-side circuit and the secondary-side circuit are separately mounted in an outdoor unit, a relay unit, and a plurality of indoor units,
    wherein the compressor, the first flow switching device, the outdoor heat exchanger, the second flow switching device, and the first expansion device are mounted in the outdoor unit, and
    wherein each of the indoor heat exchanger and each of the heat medium flow control device are mounted in an indoor unit among the indoor units.

3. The air-conditioning apparatus of claim 2,
    wherein the primary-side circuit includes
    a primary-side outgoing pipe connecting the first flow switching device and the relay heat exchanger to each other, and
        a primary-side return pipe connecting the relay heat exchanger and the second flow switching device to each other and having a pipe diameter that is 1.2 to 3.0 times a pipe diameter of the primary-side outgoing pipe.

4. The air-conditioning apparatus of claim 1,
    wherein the primary-side circuit includes
    a primary-side outgoing pipe connecting the first flow switching device and the relay heat exchanger to each other, and
    a primary-side return pipe connecting the relay heat exchanger and the second flow switching device to each other and having a pipe diameter that is 1.2 to 3.0 times a pipe diameter of the primary-side outgoing pipe.

5. The air-conditioning apparatus of claim 1,
    wherein a non-azeotropic refrigerant mixture circulates in the primary-side circuit, and
    wherein the controller controls a quality of the non-azeotropic refrigerant mixture, degree of superheat, or a degree of subcooling of the non-azeotropic refrigerant mixture.

6. The air-conditioning apparatus of claim 5, further comprising:
    a refrigerant outlet temperature sensor installed between the relay heat exchanger and the second flow switching device; and a first liquid temperature sensor that detects a temperature of the non-azeotropic refrigerant flowing in the refrigerant-refrigerant heat exchanger, wherein the controller controls the first expansion device during the cooling operation, based on a temperature detected by the refrigerant outlet temperature sensor, such that the non-azeotropic refrigerant mixture that flows out of the relay heat exchanger has a quality of 0.9 or more or a degree of superheat of 3 K or less, and controls the first expansion device during the heating operation, based on a temperature detected by the first liquid temperature sensor or a temperature detected by the refrigerant outlet temperature sensor, such that the non-azeotropic refrigerant mixture that flows out of the relay heat exchanger has a quality of 0.2 or less or a degree of subcooling of 15 K or less.

7. The air-conditioning apparatus of claim 5, further comprising:

a high-pressure sensor that detects a pressure of the refrigerant flowing between the refrigerant-refrigerant heat exchanger and the first expansion device;

a second liquid temperature sensor that detects a temperature of the refrigerant flowing between the refrigerant-refrigerant heat exchanger and the first expansion device;

a two-phase temperature sensor that detects a temperature of the refrigerant flowing between the bypass expansion device and the refrigerant-refrigerant heat exchanger; and a low-pressure sensor that detects a pressure of the refrigerant flowing between the second flow switching device and the compressor, wherein the controller senses a refrigerant composition, based on the pressure detected by the high-pressure sensor, the temperature detected by the second liquid temperature sensor, the temperature detected by the two-phase temperature sensor, and the pressure detected by the low-pressure sensor.

8. The air-conditioning apparatus of claim 7, wherein the controller sets, as the refrigerant composition, a composition in which a liquid refrigerant enthalpy calculated based on the pressure detected by the high-pressure sensor and the temperature detected by the second liquid temperature sensor is equal to a two-phase refrigerant enthalpy calculated based on the temperature detected by the two-phase temperature sensor and the pressure detected by the low-pressure sensor.

9. An air-conditioning apparatus comprising:

a primary-side circuit in which a compressor that compresses refrigerant, a first flow switching device that switches a circulation path of the refrigerant, an outdoor heat exchanger that exchanges heat between the refrigerant and a heat-source-side fluid, a second flow switching device that switches the circulation path of the refrigerant, a first expansion device and a second expansion device each of which is disposed at a pipe between the first flow switching device and the second flow switching device and adjust a pressure of the refrigerant, and a first relay heat exchanger and a second relay heat exchanger that exchange heat between the refrigerant and a heat medium different from the refrigerant are connected by pipes and in which the refrigerant circulates;

a secondary-side circuit in which the first relay heat exchanger, the second relay heat exchanger, a first pump and a second pump that pressurize the heat medium, a plurality of indoor heat exchangers, each of which exchanges heat between the heat medium and air for an air-conditioning target space, heat medium flow control devices, each of which is installed in such a manner as to correspond to an indoor heat exchanger among the indoor heat exchangers and adjusts a flow rate of the heat medium passing through the indoor heat exchanger, heat medium flow switching devices, each of which is installed between the first relay heat exchanger and an indoor heat exchanger among the indoor heat exchangers and switches a circulation path of the heat medium, and heat medium flow switching devices, each of which is installed between the second relay heat exchanger and an indoor heat exchanger among the indoor heat exchangers and switches the circulation path of the heat medium, are connected by pipes and in which the heat medium circulates; and a refrigerant-refrigerant heat exchanger disposed at a pipe connecting between the second flow switching device and the first expansion device, a bypass circuit including a bypass pipe having one end connected to a pipe between the refrigerant-refrigerant heat exchanger and the first expansion device and an other end connected to a pipe between the second flow switching device and the compressor and a bypass expansion device that adjusts flow rate of the refrigerant passing through the bypass pipe, a controller configured to control the first flow switching device and the second flow switching device to provide the circulation path of the refrigerant such that in a cooling operation, a heating operation, and a cooling and heating simultaneous operation, the refrigerant and the heat-source-side fluid flow through the outdoor heat exchanger in opposite directions, and the refrigerant flows through the first relay heat exchanger and the second relay heat exchanger in a constant direction, wherein the first pump and the second pump are installed such that the heat medium flows through the first relay heat exchanger and the second relay heat exchanger in a direction opposite to the direction in which the refrigerant flows, and the refrigerant-refrigerant heat exchanger is disposed such that the refrigerant passing through the refrigerant-refrigerant heat exchanger and flowing between the second flow switching device and the first expansion device and the refrigerant passing through the refrigerant-refrigerant heat exchanger and flowing through the bypass circuit flow in opposite directions, and exchanges, in the refrigerant-refrigerant heat exchanger, heat between high-pressure two-phase refrigerant or liquid refrigerant flowing between the second flow switching device and the first expansion device and low-pressure two-phase refrigerant flowing through the bypass circuit having the bypass pipe in any of cooling and the heating operations.

10. The air-conditioning apparatus of claim 9, wherein a non-azeotropic refrigerant mixture circulates in the primary-side circuit, and wherein the controller controls a refrigerant composition of the non-azeotropic refrigerant mixture and a quality, a degree of superheat, or a degree of subcooling of the non-azeotropic refrigerant mixture.

11. The air-conditioning apparatus of claim 10, further comprising:
- a refrigerant outlet temperature sensor installed between the second relay heat exchanger and the second flow switching device; and
- a first liquid temperature sensor that detects a temperature of the non-azeotropic refrigerant mixture flowing in the refrigerant-refrigerant heat exchanger,
- wherein the controller controls the first expansion device during the cooling operation, based on a temperature detected by the refrigerant outlet temperature sensor, such that the non-azeotropic refrigerant mixture that flows out of the first relay heat exchanger and the second relay heat exchanger has a quality of 0.9 or more or a degree of superheat of 3 K or less, and controls the first expansion device during the heating operation, based on a temperature detected by the first liquid temperature sensor or the refrigerant outlet temperature sensor, such that the non-azeotropic refrigerant mixture that flows out of the second relay heat exchanger has a quality of 0.2 or less or a degree of subcooling of 15 K or less.

12. The air-conditioning apparatus of claim 11, further comprising
- a refrigerant intermediate temperature sensor installed between the first relay heat exchanger and the second expansion device,
- wherein the controller
- controls the second expansion device during a cooling and heating simultaneous operation in which a cooling-main operation is performed, based on a temperature detected by the refrigerant outlet temperature sensor, such that the non-azeotropic refrigerant mixture that flows out of the second relay heat exchanger has a quality of 0.9 or more or a degree of superheat of 3 K or less, and controls the second expansion device during a cooling and heating simultaneous operation in which a heating-main operation is performed, based on a temperature detected by the refrigerant intermediate temperature sensor, such that the refrigerant that flows out of the first relay heat exchanger has a quality of 0.2 or less or a degree of subcooling of 15 K or less.

13. The air-conditioning apparatus of claim 9,
- wherein devices included in the primary-side circuit and the secondary-side circuit are separately mounted in an outdoor unit, a relay unit, and a plurality of indoor units,
- wherein the compressor, the first flow switching device, the outdoor heat exchanger, the second flow switching device, and the first expansion device are mounted in the outdoor unit, and
- wherein each of the indoor heat exchanger and each of the heat medium flow control device are mounted in an indoor unit among the indoor units.

14. The air-conditioning apparatus of claim 9,
- wherein the primary-side circuit includes
- a primary-side outgoing pipe connecting the first flow switching device and the relay heat exchanger to each other, and
- a primary-side return pipe connecting the relay heat exchanger and the second flow switching device to each other and having a pipe diameter that is 1.2 to 3.0 times a pipe diameter of the primary-side outgoing pipe.

* * * * *